United States Patent
Liu et al.

(10) Patent No.: US 11,678,216 B2
(45) Date of Patent: Jun. 13, 2023

(54) DATA TRANSMISSION METHOD, TERMINAL, AND STORAGE MEDIUM FOR MAPPING A QUALITY OF SERVICE FLOW TO A LOGICAL CHANNEL

(71) Applicant: HUAWEI TECHNOLOGIES CO., LTD., Shenzhen (CN)

(72) Inventors: Jing Liu, Shanghai (CN); Jun Wang, Shanghai (CN); Mingzeng Dai, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 205 days.

(21) Appl. No.: 17/213,656

(22) Filed: Mar. 26, 2021

(65) Prior Publication Data
US 2021/0219168 A1 Jul. 15, 2021

Related U.S. Application Data

(63) Continuation of application No. PCT/CN2019/106900, filed on Sep. 20, 2019.

(30) Foreign Application Priority Data
Sep. 28, 2018 (CN) .......................... 201811156284.8

(51) Int. Cl.
*H04W 28/02* (2009.01)
*H04W 28/10* (2009.01)
(Continued)

(52) U.S. Cl.
CPC ... *H04W 28/0268* (2013.01); *H04W 28/0205* (2013.01); *H04W 28/10* (2013.01);
(Continued)

(58) Field of Classification Search
CPC .................. H04W 28/00–16; H04W 72/12–14
See application file for complete search history.

(56) References Cited

U.S. PATENT DOCUMENTS 10,938,497 B2    3/2021 Parkvall et al.
2020/0344637 A1* 10/2020 Kim ................. H04W 28/0268
2021/0250302 A1*  8/2021 Loehr ..................... H04L 47/11

FOREIGN PATENT DOCUMENTS

CN    102883457 A    1/2013
CN    106162930 A   11/2016
(Continued)

OTHER PUBLICATIONS

Qualcomm Incorporated, LG Electronics, InterDigital Inc., eV2X QoS Support of PC5 communications. SA WG2 Meeting #128, Jul. 2-6, 2018, Vilnius, Lithuania, S2-186979, 3 pages.
(Continued)

*Primary Examiner* — Ronald Eisner
(74) *Attorney, Agent, or Firm* — Rimon PC

(57) ABSTRACT

A data transmission method to implement flexible switching of data transmission between different interfaces, includes: A first terminal obtains a quality of service flow identifier of the first terminal and a QoS parameter of a quality of service flow, where there is a correspondence between the quality of service flow identifier and the QoS parameter of the quality of service flow, and determines, based on the QoS parameter, a logical channel used by the quality of service flow on a PC5 interface. The first terminal maps the quality of service flow to the determined logical channel, and sends the quality of service flow to the second terminal.

18 Claims, 16 Drawing Sheets

(51) Int. Cl.
  *H04W 4/40* (2018.01)
  *H04W 84/04* (2009.01)
(52) U.S. Cl.
  CPC .......... *H04W 4/40* (2018.02); *H04W 28/0263* (2013.01); *H04W 84/042* (2013.01)

(56) References Cited

FOREIGN PATENT DOCUMENTS

| EP | 3273634 A1 | 1/2018 |
| WO | 2018016157 A1 | 1/2018 |
| WO | 2018026169 A1 | 2/2018 |
| WO | 2018066876 A1 | 4/2018 |
| WO | 2018131902 A1 | 7/2018 |

OTHER PUBLICATIONS

Qualcomm Incorporated, LG Electronics, InterDigital Inc., eV2X QoS Support of PC5 communications. SA WG2 Meeting #128, Jul. 2-6, 2018, Vilnius, Lithuania, S2-186990, 3 pages.
Huawei, HiSilicon, QoS management for NR V2X. 3GPP TSG RAN WG1 Meeting #94, Gothenburg, Sweden, Aug. 20-24, 2018, R1-1809336, 3 pages.
3GPP TS 23.501 V15.3.0 (Sep. 2018), 3rd Generation Partnership Project; Technical Specification Group Services and System Aspects; System Architecture for the 5G System; Stage 2(Release 15), ETSI TS v15.3.0) 227 pages.
Huawei et al: "Support of QoS for PC5-based V2V transport", 3GPP Draft; R2-162286,Apr. 2, 2016, XP051082359, total 6 pages.

\* cited by examiner

CONT.
FROM
FIG. 8A

CONT.
FROM
FIG. 8A

CONT.
FROM
FIG. 8A

S804: The radio access network device sends the identifier of the first logical channel and an identifier of the second logical channel to the second terminal, where there is a second correspondence between the identifier of the first logical channel and the identifier of the second logical channel S805: The radio access network device maps the quality of service flow received from the first terminal to the second logical channel, and sends the quality of service flow to the second terminal S806: The second terminal determines, based on the second correspondence, that a quality of service flow sent by the radio access network device through the second logical channel and the quality of service flow sent by the first terminal through the first logical channel belong to a same quality of service flow, and sends the quality of service flows to a same protocol layer for processing

FIG. 8B

DATA TRANSMISSION METHOD, TERMINAL, AND STORAGE MEDIUM FOR MAPPING A QUALITY OF SERVICE FLOW TO A LOGICAL CHANNEL

CROSS-REFERENCE TO RELATED APPLICATIONS

This application is a continuation of International Application No. PCT/CN2019/106900, filed on Sep. 20, 2019, which claims priority to Chinese Patent Application No. 201811156284.8, filed on Sep. 28, 2018. The disclosures of the aforementioned applications are herein incorporated by reference in their entireties.

TECHNICAL FIELD

This application relates to the field of communications technologies, and in particular, to a data transmission method, a terminal, and a storage medium.

BACKGROUND

In a long term evolution (LTE) system, in a vehicle to X (V2X) communication scenario, there are two types of interfaces: a Uu interface and a wireless direct communication (PC5) interface. The Uu interface is an interface between a vehicle (as a terminal) and a radio access network device, and the PC5 interface is an interface between two direct communication vehicles (as terminals).

In the LTE system, the Uu interface uses a quality of service (QoS) mechanism based on an E-UTRA radio access bearer (E-RAB). In a downlink (DL), the radio access network device determines to map a data packet that needs to be sent to the vehicle/terminal to a corresponding data radio bearer (DRB) and send the data packet to the vehicle/terminal. In an uplink (UL), the vehicle/terminal maps a data packet to a corresponding DRB by using a traffic flow template (UL TFT) sent by a core network device (for example, a mobility management entity (MME)) and sends the data packet to the radio access network device.

In the LTE system, the PC5 interface uses a QoS mechanism based on a prose per-packet priority (PPPP) and/or prose per-packet reliability (PPPR). The PPPP is used to indicate a scheduling priority, on the PC5 interface, of a data packet associated with the PPPP, to ensure a transmission delay of the data packet on the PC5 interface. The PPPR is used to indicate a reliability requirement, on the PC5 interface, of a data packet associated with the PPPR, to ensure a transmission reliability of the data packet on the PC5 interface. After receiving, from an application layer of a transmit-end vehicle/terminal, a data packet associated with the PPPP and/or the PPPR, the transmit-end vehicle/terminal maps the data packet to a logical channel of the PC5 interface and sends the data packet to a receive-end vehicle/terminal. The transmit-end vehicle/terminal determines, based on a PPPP value corresponding to the data packet, a scheduling priority, on the PC5 interface, of the logical channel used to transmit the data packet, and determines, based on a PPPR value corresponding to the data packet, a quantity of blind retransmission times of the data packet on the PC5 interface.

In 5G NR, a finer-grained QoS mechanism, namely, a flow-based QoS mechanism, is introduced to the Uu interface. In addition, a service data adaptation protocol (SDAP) layer is introduced above a packet data convergence protocol (PDCP) layer, and a function of the SDAP layer is: 1. Map a quality of service flow (QoS flow) to the DRB. 2; and 2. Carry a quality of service flow identifier (QFI). In the DL, the radio access network device maps a quality of service flow to a corresponding DRB based on a QoS parameter corresponding to the quality of service flow, and sends the quality of service flow to the vehicle/terminal. In the UL, the vehicle/terminal first performs mapping from an Internet Protocol (IP) packet of the vehicle/terminal to a quality of service flow QoS flow at a non-access stratum (NAS) layer based on obtained quality of service flow rule (QoS rules) information, and then maps the quality of service flow QoS flow to a corresponding DRB at an access (Access Stratum, AS) layer, and sends the quality of service flow QoS flow to the radio access network device.

In 5G NR, in a V2X communication scenario, V2X services have more QoS requirements. If the Uu interface and the PC5 interface still use different QoS mechanisms, the V2X services on the PC5 interface cannot meet all QoS requirements, and the V2X services cannot be flexibly switched between the Uu interface and the PC5 interface, which may cause packet loss.

SUMMARY

Embodiments of this application provide a data transmission method, a terminal, and a storage medium, to implement flexible switching of data transmission between different interfaces, and ensure that no packet loss occurs during interface switching.

According to a first aspect, this application provides a data transmission method, including: A first terminal obtains a quality of service flow identifier and a QoS parameter of a quality of service flow, where there is a correspondence between the quality of service flow identifier and the QoS parameter of the quality of service flow; the first terminal determines a logical channel used by the quality of service flow of the first terminal on a wireless direct communications interface, where the wireless direct communications interface is a communications interface between the first terminal and a second terminal; and the first terminal maps the quality of service flow to the logical channel, and sends the quality of service flow to the second terminal.

In other words, a unified QoS mechanism is used on a Uu interface and a PC5 interface. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

Optionally, that the first terminal determines a logical channel used by the quality of service flow of the first terminal on a wireless direct communications interface includes: The first terminal determines, based on the correspondence, the logical channel used by the quality of service flow of the first terminal on the wireless direct communications interface.

Optionally, the quality of service flow identifier may be a QFI. The QoS parameter of the quality of service flow may include any one or more of the following: a 5G quality identifier (5QI) of the quality of service flow, and a priority, a packet delay budget (PDB), and a packet error rate (PER) of the quality of service flow. Optionally, that there is a correspondence between the quality of service flow identifier and the QoS parameter of the quality of service flow includes a correspondence between the quality of service flow identifier and a 5G quality identifier of the quality of service flow, or a correspondence between the quality of service flow identifier and at least one quality parameter of a priority, a packet delay budget, and a packet error rate of the quality of service flow.

Optionally, the quality of service flow identifier and the QoS parameter of the quality of service flow are carried in a radio resource control (RRC) message or a non-access stratum (NAS) message.

According to a second aspect, this application provides a data transmission method, including: A first terminal receives a quality of service flow identifier and an identifier of a logical channel on a wireless direct communications interface that are sent by a radio access network device, where there is a correspondence between the quality of service flow identifier and the identifier of the logical channel on the wireless direct communications interface, and the wireless direct communications interface is a communications interface between the first terminal and a second terminal; and the first terminal maps a quality of service flow to the logical channel based on the correspondence, and sends the quality of service flow to the second terminal.

In other words, a unified QoS mechanism is used on the Uu interface and the PC5 interface. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

According to a third aspect, this application provides a data transmission method, including: A first terminal obtains a prose per-packet priority (PPPP) and/or prose per-packet reliability (PPPR) and a QoS parameter of a quality of service flow of the first terminal, where there is a correspondence between the PPPP and/or the PPPR and the QoS parameter; the first terminal maps, based on the correspondence, a data packet associated with the PPPP and/or the PPPR to the quality of service flow associated with the QoS parameter; the first terminal determines a logical channel used by the quality of service flow on a wireless direct communications interface; and the first terminal maps the quality of service flow to the logical channel, and sends the quality of service flow to a second terminal.

In other words, a unified QoS mechanism is used on the Uu interface and the PC5 interface. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

Optionally, the QoS parameter of the quality of service flow may include any one or more of the following: a 5G quality identifier of the quality of service flow, and a priority, a packet delay budget, and a packet error rate of the quality of service flow.

Optionally, the correspondence between the PPPP and/or the PPPR and the QoS parameter of the quality of service flow of the first terminal includes a correspondence between the PPPP and/or the PPPR and a 5G quality identifier of the quality of service flow, or a correspondence between the PPPP and/or the PPPR and at least one quality parameter of a priority, a packet delay budget, and a packet error rate of the quality of service flow.

Optionally, the correspondence is obtained after a V2X control functional entity in a near-end communications system negotiates with a packet control function (PCF) entity in a 3GPP system.

Optionally, the method includes: The first terminal obtains the correspondence by using a data radio bearer (DRB); or the first terminal obtains the correspondence by using a radio resource control message; or the first terminal obtains the correspondence by using a non-access stratum message.

According to a fourth aspect, this application provides a data transmission method, including: A first terminal obtains a quality of service flow of the first terminal, where the quality of service flow is associated with a QoS parameter; the first terminal determines a logical channel used by the quality of service flow on a wireless direct communications interface; and the first terminal maps the quality of service flow to the logical channel, and sends the quality of service flow to a second terminal.

In other words, a unified QoS mechanism is used on the Uu interface and the PC5 interface. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

Optionally, the QoS parameter of the quality of service flow may include any one or more of the following: a 5G quality identifier of the quality of service flow, and a priority, a packet delay budget, and a packet error rate of the quality of service flow.

Optionally, that the quality of service flow is associated with a QoS parameter includes: The quality of service flow is associated with a 5G quality identifier of the quality of service flow; or the quality of service flow is associated with at least one quality parameter of a priority, a packet delay budget, and a packet error rate of the quality of service flow.

Optionally, the method further includes: The first terminal obtains a quality of service flow identifier and at least one quality parameter of a guaranteed bit rate (GBR) and a maximum bit rate (MBR) of the quality of service flow, where there is a correspondence between the quality of service flow identifier and the at least one quality parameter; or the first terminal obtains a 5G quality identifier of the quality of service flow and at least one quality parameter of a guaranteed bit rate and a maximum bit rate of the quality of service flow, where there is a correspondence between the quality of service flow identifier and the at least one quality parameter, so that a rate at which the quality of service flow is sent to the second terminal can be controlled; and/or the first terminal obtains an aggregate maximum bit rate (AMBR) of all non-guaranteed bit rate (Non-GBR) services sent by the first terminal to the second terminal. Therefore, a rate at which the Non-GBR quality of service flow is sent to the second terminal can be controlled.

Optionally, before the first terminal maps the quality of service flow to the logical channel, and sends the quality of service flow to a second terminal, the method further includes: The first terminal determines a priority of the logical channel based on the priority of the quality of service flow; or the first terminal obtains a priority of the logical channel from the radio access network device.

Optionally, the method further includes: The first terminal obtains a quality of service flow identifier and an identifier of a logical channel group (LCG) on the wireless direct communications interface, where there is a correspondence between the quality of service flow identifier and the identifier of the LCG, and the correspondence between the quality of service flow identifier and the identifier of the LCG is used by the first terminal to send a buffer status report (BSR) to an access side device; or the first terminal obtains an identifier of the logical channel on the wireless direct communications interface and an identifier of a logical channel group LCG, where there is a correspondence between the identifier of the logical channel and the identifier of the LCG, and the correspondence between the identifier of the logical channel and the identifier of the LCG is used by the first terminal to send a buffer status report to an access side device; or the first terminal obtains a 5G quality identifier of the quality of service flow and an identifier of a logical channel group on the wireless direct communications interface, where there is a correspondence between the 5QI and the identifier of the LCG, and the correspondence between the 5QI and the identifier of the LCG is used by the first terminal to send a buffer status report BSR to an access side device, to request scheduling resources on the PC5 interface.

Optionally, when the first terminal communicates with both the radio access network device and the second terminal, before the first terminal maps the quality of service flow to the logical channel, and sends the quality of service flow to a second terminal, the method further includes: The first terminal obtains a preset value; and correspondingly, that the first terminal maps the quality of service flow to the logical channel, and sends the quality of service flow to a second terminal includes: If at least one of the quality of service flow identifier (QFI), the priority of the quality of service flow, and the 5G quality identifier of the quality of service flow is less than or equal to the preset value, the first terminal preferentially sends the quality of service flow to the second terminal through the logical channel.

Optionally, before the first terminal maps the quality of service flow to the logical channel, and sends the quality of service flow to a second terminal, the method further includes: The first terminal sends sidelink control information (SCI) on the wireless direct communications interface to the second terminal, where the SCI includes at least one of the following parameters: the quality of service flow identifier and the 5G quality identifier of the quality of service flow, so that the second terminal senses a service situation on the wireless direct communications interface.

Optionally, the method further includes: The first terminal sends, to the radio access network device, at least one of the following: the quality of service flow identifier and the 5G quality identifier of the quality of service flow, so that the radio access network device determines whether semi-persistent scheduling needs to be performed on the first terminal.

According to a fifth aspect, this application provides a data transmission method, including: A second terminal receives a quality of service flow sent by a first terminal through a first logical channel on a wireless direct communications interface, where the quality of service flow is associated with a QFI; the second terminal receives a quality of service flow sent by a radio access network device through a second logical channel on a Uu interface, where the quality of service flow is associated with a QFI; and if the QFI of the quality of service flow received from the first logical channel is the same as the QFI of the quality of service flow received from the second logical channel, the second terminal sends the quality of service flows to a same protocol layer for processing. Therefore, continuity of the quality of service flows that exist before and after being switched between different interfaces is ensured.

Optionally, the second terminal has both a user plane protocol stack of the Uu interface and a user plane protocol stack of the wireless direct communications interface, where the the user plane protocol stack of the wireless direct communications interface includes: a first physical (PHY) layer, a first media access control (MAC) layer, a first radio link control (RLC) layer, a first packet data convergence protocol (PDCP) layer, a first service data adaptation protocol (SDAP) layer, an adaptation layer, and an application layer from bottom to top, and the user plane protocol stack of the Uu interface includes a second PHY layer, a second MAC layer, a second RLC layer, a second PDCP layer, a second SDAP layer, the adaptation layer, and the application layer from bottom to top. Correspondingly, the sending the quality of service flows to a same protocol layer for processing includes: The second terminal sends the quality of service flows received from the Uu interface and the wireless direct communications interface to the same adaptation layer for processing.

According to a sixth aspect, this application provides a data transmission method, including: A radio access network device receives a quality of service flow identifier and an identifier of a first logical channel that are sent by a first terminal, where there is a first correspondence between the quality of service flow identifier and the identifier of the first logical channel, and the quality of service flow is a quality of service flow sent by the first terminal to a second terminal through the first logical channel on a wireless direct communications interface; and the radio access network device determines a second correspondence between the first logical channel and a second logical channel, maps the quality of service flow received from the first terminal to the second logical channel, and sends the identifier of the first logical channel and an identifier of the second logical channel to the second terminal, where the second logical channel is a logical channel on a Uu interface between the radio access network device and the second terminal.

According to a seventh aspect, this application provides a data transmission method, including: A second terminal receives an identifier of a first logical channel and an identifier of a second logical channel that are sent by a radio access network device, where there is a second correspondence between the identifier of the first logical channel and the identifier of the second logical channel, the first logical channel is a logical channel on a wireless direct communications interface between a first terminal and the second terminal, and the second logical channel is a logical channel on a Uu interface between the radio access network device and the second terminal; and the second terminal determines, based on the second correspondence, that a quality of service flow sent by the radio access network device through the second logical channel and a quality of service flow sent by the first terminal through the first logical channel belong to a same quality of service flow, and sends the quality of service flows to a same protocol layer for processing. Therefore, continuity of the quality of service flows that exist before and after being switched between different interfaces is ensured.

Optionally, before a second terminal receives an identifier of a first logical channel and an identifier of a second logical channel that are sent by a radio access network device, the method further includes: The second terminal receives a quality of service flow through a first logical channel on a wireless direct communications interface.

Optionally, the second terminal has both a user plane protocol stack of the Uu interface and a user plane protocol stack of the wireless direct communications interface, where the user plane protocol stack of the Uu interface includes: a first PHY layer, a first MAC layer, a first RLC layer, a first PDCP layer, a first SDAP layer, an adaptation layer, and an application layer from bottom to top, and the user plane protocol stack of the wireless direct communications interface includes a second PHY layer, a second MAC layer, a second RLC layer, a second PDCP layer, the adaptation layer, and the application layer from bottom to top. Correspondingly, the sending the quality of service flows to a same protocol layer for processing includes: The second terminal sends the quality of service flows received from the Uu interface and the wireless direct communications interface to the same adaptation layer for processing.

Optionally, the second terminal has both a user plane protocol stack of the Uu interface and a user plane protocol stack of the wireless direct communications interface, where the user plane protocol stack of the Uu interface includes: a first PHY layer, a first MAC layer, a first RLC layer, a PDCP layer, a SDAP layer, and an application layer from bottom to top, and the user plane protocol stack of the wireless direct communications interface includes a second PHY layer, a second MAC layer, a second RLC layer, the PDCP layer, the SDAP layer, and the application layer from bottom to top. Correspondingly, the sending the quality of service flows to a same protocol layer for processing includes: The second terminal sends the quality of service flows received from the Uu interface and the wireless direct communications interface to the same PDCP layer for processing.

Optionally, that a second terminal receives an identifier of a first logical channel and an identifier of a second logical channel that are sent by a radio access network device includes: The second terminal receives, by using an RRC message or wireless direct communications interface signaling of the Uu interface, the identifier of the first logical channel and the identifier of the second logical channel that are sent by the radio access network device.

According to an eighth aspect, this application provides a data transmission method, including: A radio access network device receives a quality of service flow sent by a first terminal, maps the quality of service flow to a second logical channel, and sends the quality of service flow to a second terminal, where the second logical channel is a logical channel on a Uu interface between the radio access network device and the second terminal; and the radio access network device sends a quality of service flow identifier and an identifier of the second logical channel to the first terminal, and sends the quality of service flow to the second terminal through the second logical channel, where there is a correspondence between the quality of service flow identifier and the identifier of the second logical channel. Therefore, continuity of the quality of service flows that exist before and after being switched between different interfaces is ensured.

According to a ninth aspect, this application provides a data transmission method, including: A first terminal sends a quality of service flow to a radio access network device; the first terminal receives a quality of service flow identifier and an identifier of a second logical channel that are sent by the radio access network device, where there is a correspondence between the quality of service flow identifier and the identifier of the second logical channel, and the second logical channel is a logical channel on a Uu interface between the radio access network device and a second terminal; and the first terminal determines a correspondence between the second logical channel and a first logical channel, sends the identifier of the second logical channel and an identifier of the first logical channel to the second terminal, and sends the quality of service flow to the second terminal through the first logical channel. Therefore, continuity of the quality of service flows that exist before and after being switched between different interfaces is ensured.

According to a tenth aspect, this application provides a data transmission method, including: A second terminal receives an identifier of a first logical channel and an identifier of a second logical channel that are sent by a first terminal, where there is a correspondence between the identifier of the first logical channel and the identifier of the second logical channel, the first logical channel is a logical channel on a wireless direct communications interface between the first terminal and the second terminal, and the second logical channel is a logical channel on a Uu interface between a radio access network device and the second terminal; and the second terminal determines, based on the correspondence, that a quality of service flow sent by the radio access network device through the second logical channel and a quality of service flow sent by the first terminal through the first logical channel belong to a same quality of service flow, and sends the quality of service flows to a same protocol layer for processing. Therefore, continuity of the quality of service flows that exist before and after being switched between different interfaces is ensured.

Optionally, the second terminal has both a user plane protocol stack of the Uu interface and a user plane protocol stack of the wireless direct communications interface, where the user plane protocol stack of the Uu interface includes: a first PHY layer, a first MAC layer, a first RLC layer, a first PDCP layer, a first SDAP layer, an adaptation layer, and an application layer from bottom to top, and the user plane protocol stack of the wireless direct communications interface includes a second PHY layer, a second MAC layer, a second RLC layer, a second PDCP layer, the adaptation layer, and the application layer from bottom to top. Correspondingly, the sending the quality of service flows to a same protocol layer for processing includes: The second terminal sends the quality of service flows received from the Uu interface and the wireless direct communications interface to the same adaptation layer for processing.

Optionally, the second terminal has both a user plane protocol stack of the Uu interface and a user plane protocol stack of the wireless direct communications interface, where the user plane protocol stack of the Uu interface includes: a first PHY layer, a first MAC layer, a first RLC layer, a PDCP layer, a SDAP layer, and an application layer from bottom to top, and the user plane protocol stack of the wireless direct communications interface includes a second PHY layer, a second MAC layer, a second RLC layer, the PDCP layer, the SDAP layer, and the application layer from bottom to top. Correspondingly, the sending the quality of service flows to a same protocol layer for processing includes: The second terminal sends the quality of service flows received from the Uu interface and the wireless direct communications interface to the same PDCP layer for processing.

Optionally, that a second terminal receives an identifier of a first logical channel and an identifier of a second logical channel that are sent by a first terminal includes: The second terminal receives the identifier of the first logical channel and the identifier of the second logical channel by using an RRC message of the wireless direct communications interface or wireless direct communications interface signaling.

The following describes the terminal and the storage medium. For content and effects of the terminal and the storage medium, refer to the foregoing method part. Details are not described below.

According to an eleventh aspect, this application provides a terminal, where the terminal is a first terminal, and includes: an obtaining module, configured to obtain a quality of service flow identifier and a QoS parameter of a quality of service flow, where there is a correspondence between the quality of service flow identifier and the QoS parameter of the quality of service flow; a determining module, configured to determine a logical channel used by the quality of service flow of the first terminal on a wireless direct communications interface, where the wireless direct communications interface is a communications interface between the first terminal and a second terminal; and a sending module, configured to: map the quality of service flow to the logical channel, and send the quality of service flow to the second terminal.

According to a twelfth aspect, this application provides a terminal, where the terminal is a first terminal, and includes: an obtaining module, configured to receive a quality of service flow identifier and an identifier of a logical channel on a wireless direct communications interface that are sent by a radio access network device, where there is a correspondence between the quality of service flow identifier and the identifier of the logical channel on the wireless direct communications interface, and the wireless direct communications interface is a communications interface between the first terminal and a second terminal; and a sending module, configured to: map a quality of service flow to the logical channel based on the correspondence, and send the quality of service flow to the second terminal.

According to a thirteenth aspect, this application provides a terminal, where the terminal is a first terminal, and includes: an obtaining module, configured to obtain a PPPP and/or PPPR and a QoS parameter of a quality of service flow of the first terminal, where there is a correspondence between the PPPP and/or the PPPR and the QoS parameter; a mapping module, configured to map, based on the correspondence, a data packet associated with the PPPP and/or the PPPR to the quality of service flow associated with the QoS parameter; a determining module, configured to determine a logical channel used by the quality of service flow on a wireless direct communications interface; and a sending module, configured to: map the quality of service flow to the logical channel, and send the quality of service flow to a second terminal.

According to a fourteenth aspect, this application provides a terminal, where the terminal is a first terminal and includes: an obtaining module, configured to obtain a quality of service flow of the first terminal, where the quality of service flow is associated with a QoS parameter; a determining module, configured to determine a logical channel used by the quality of service flow on a wireless direct communications interface; and a sending module, configured to: map the quality of service flow to the logical channel, and send the quality of service flow to a second terminal.

According to a fifteenth aspect, this application provides a terminal, where the terminal is a second terminal and includes a receiving module and a sending module. The receiving module is configured to: receive a quality of service flow sent by a first terminal through a first logical channel on a wireless direct communications interface, and the quality of service flow is associated with a QFI; receive a quality of service flow sent by a radio access network device through a second logical channel on a Uu interface, where the quality of service flow includes a QFI; and if the QFI of the quality of service flow received from the first logical channel is the same as the QFI of the quality of service flow received from the second logical channel, the sending module sends the quality of service flows to a same protocol layer for processing.

According to a sixteenth aspect, this application provides a radio access network device, including a receiving module, a determining module, and a sending module. The receiving module is configured to receive a quality of service flow identifier QFI and an identifier of a first logical channel that are sent by a first terminal, where there is a first correspondence between the quality of service flow identifier and the identifier of the first logical channel, and the quality of service flow is a quality of service flow sent by the first terminal to a second terminal through the first logical channel on a wireless direct communications interface; the determining module is configured to determine a second correspondence between the first logical channel and a second logical channel; and the sending module is configured to: map the quality of service flow received from the first terminal to the second logical channel, send the quality of service flow to the second terminal, and send the identifier of the first logical channel and an identifier of the second logical channel to the second terminal, where the second logical channel is a logical channel on a Uu interface between the radio access network device and the second terminal. Therefore, continuity of the quality of service flows that exist before and after being switched between different interfaces is ensured.

According to a seventeenth aspect, this application provides a terminal, where the terminal is a second terminal and includes a receiving module, a determining module, and a sending module. The receiving module is configured to receive an identifier of a first logical channel and an identifier of a second logical channel that are sent by a radio access network device, where there is a second correspondence between the identifier of the first logical channel and the identifier of the second logical channel, the first logical channel is a logical channel on a wireless direct communications interface between a first terminal and the second terminal, and the second logical channel is a logical channel on a Uu interface between the radio access network device and the second terminal; the determining module is configured to determine, based on the second correspondence, that a quality of service flow sent by the radio access network device through the second logical channel and a quality of service flow sent by the first terminal through the first logical channel belong to a same quality of service flow; and the sending module is configured to send the quality of service flows to a same protocol layer for processing. Therefore, continuity of the quality of service flows that exist before and after being switched between different interfaces is ensured.

According to an eighteenth aspect, this application provides a radio access network device, including a receiving and mapping module and a sending module. The receiving and mapping module is configured to: receive a quality of service flow sent by a first terminal, map the quality of service flow to a second logical channel, and send the quality of service flow to a second terminal, where the second logical channel is a logical channel on a Uu interface between the radio access network device and the second terminal; and the sending module is configured to: send a quality of service flow identifier QFI and an identifier of the second logical channel to the first terminal, and send the quality of service flow to the second terminal through the second logical channel, where there is a correspondence between the quality of service flow identifier and the identifier of the second logical channel. Therefore, continuity of the quality of service flows that exist before and after being switched between different interfaces is ensured.

According to a nineteenth aspect, this application provides a terminal, where the terminal is a first terminal, and includes a sending module, a receiving module, and a determining module. The sending module is configured to send a quality of service flow to a radio access network device; the receiving module is configured to receive a quality of service flow identifier and an identifier of a second logical channel that are sent by the radio access network device, where there is a correspondence between the quality of service flow identifier and the identifier of the second logical channel, and the second logical channel is a logical channel on a Uu interface between the radio access network device and a second terminal; the determining module is configured to determine a correspondence between the second logical channel and a first logical channel; and the sending module is configured to: send the identifier of the second logical channel and an identifier of the first logical channel to the second terminal, and send the quality of service flow to the second terminal through the first logical channel. Therefore, continuity of the quality of service flows that exist before and after being switched between different interfaces is ensured.

According to a twentieth aspect, this application provides a terminal, where the terminal is a second terminal, and includes a receiving module, a determining module, and a sending module. The receiving module is configured to receive an identifier of a first logical channel and an identifier of a second logical channel that are sent by a first terminal, where there is a correspondence between the identifier of the first logical channel and the identifier of the second logical channel, the first logical channel is a logical channel on a wireless direct communications interface between the first terminal and the second terminal, and the second logical channel is a logical channel on a Uu interface between a radio access network device and the second terminal; the determining module is configured to determine, based on the correspondence, that a quality of service flow sent by the radio access network device through the second logical channel and a quality of service flow sent by the first terminal through the first logical channel belong to a same quality of service flow; and the sending module is configured to send the quality of service flows to a same protocol layer for processing. Therefore, continuity of the quality of service flows that exist before and after being switched between different interfaces is ensured.

According to a twenty-first aspect, this application provides a terminal, including a memory and a processor. The memory is configured to store a computer program, and the computer program runs in the processor, so that the terminal implements the method according to any one of the first aspect and the optional manners of the first aspect, the second aspect and the optional manners of the second aspect, the third aspect and the optional manners of the third aspect, the fourth aspect and the optional manners of the fourth aspect, the fifth aspect and the optional manners of the fifth aspect, the seventh aspect and the optional manners of the seventh aspect, the ninth aspect and the optional manners of the ninth aspect, or the tenth aspect and the optional manners of the tenth aspect.

According to a twenty-second aspect, this application provides a radio access network device, including a memory and a processor. The memory is configured to store a computer program, and the computer program runs in the processor, so that the radio access network device implements the method according to any one of the sixth aspect and the optional manners of the sixth aspect or the eighth aspect and the optional manners of the eighth aspect.

According to a twenty-third aspect, this application provides a storage medium. The storage medium includes a computer program, and the computer program is configured to implement the method according to any one of the first aspect and the optional manners of the first aspect to the tenth aspect and the optional manners of the tenth aspect.

According to a twenty-fourth aspect, this application provides a computer program product, including a computer program. The computer program is configured to implement the method according to any one of the first aspect and the optional manners of the first aspect to the tenth aspect and the optional manners of the tenth aspect.

The embodiments of this application provide a data transmission method, a terminal, and a storage medium. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

BRIEF DESCRIPTION OF DRAWINGS

FIG. 8A and FIG. 8B are an interaction flowchart of a data transmission method according to an embodiment of this application;

DESCRIPTION OF EMBODIMENTS

As described above, in a V2X scenario of 5G NR, V2X services have more QoS requirements. If different interfaces still use different QoS mechanisms, the V2X services cannot meet all QoS requirements on a PC5 interface. In addition, the V2X services cannot be flexibly switched between a Uu interface and the PC5 interface, which may cause packet loss. To resolve the technical problem, this application provides a data transmission method, a terminal, a radio access network device, and a storage medium. The radio access network device involved in embodiments of the invention may be a base transceiver station (BTS) in global system for mobile communications (GSM) or code division multiple access (CDMA), or may be a NodeB (NB) in wideband code division multiple access (WCDMA), or may be an evolved NodeB (eNB), an access point (AP), or a relay station in an LTE network, or may be a base station in a next generation network (namely, a 5G network), or the like. This is not limited herein.

In addition, the terminal mentioned in the embodiments of the invention refers to a device that provides a user with voice and/or data connectivity, a handheld device with a radio connection function, or another processing device connected to a radio modem. The terminal may communicate with at least one core network by using a radio access network (RAN). The terminal may be a mobile terminal, for example, a mobile phone (or also referred to as a "cellular" phone), and a computer that has a mobile terminal. For example, the UE may be a portable, pocket-size, handheld, computer-integrated or vehicle-mounted mobile apparatus, which exchanges voice and/or data with the radio access network. The terminal may also be referred to as a subscriber unit, a subscriber station, a mobile station, a mobile terminal (Mobile), a remote station, an access point, a remote terminal, an access terminal, a user terminal, a user agent, user equipment, or a vehicle in a V2X scenario. This is not limited herein.

Figure 1:
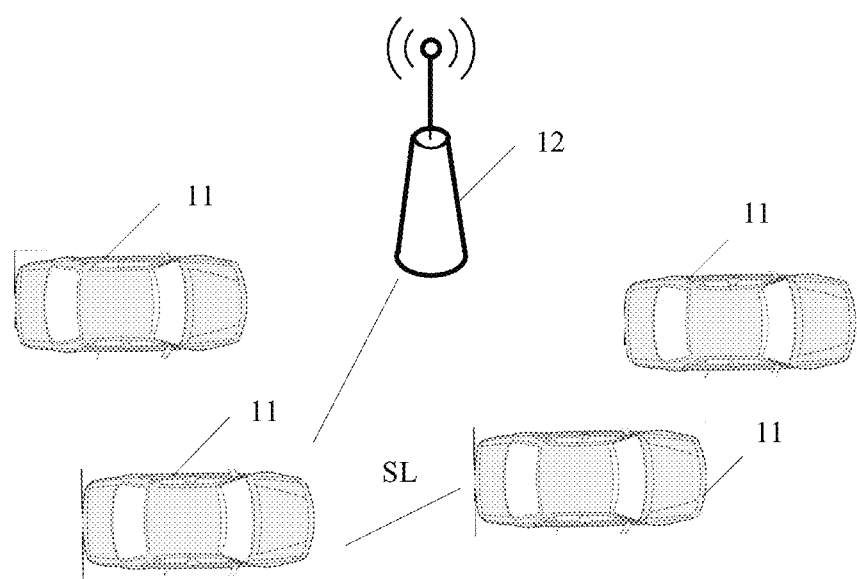
FIG. 1 is a diagram of an application scenario according to an embodiment of this application.

FIG. 1 is a diagram of an application scenario according to an embodiment of this application. As shown in FIG. 1, data transmission between terminals 11 may be implemented by using a Uu interface with a radio access network device 12, and/or data transmission between terminals 11 may be implemented by using a PC5 interface. In Embodiment 1 to Embodiment 7 of this application, the Uu interface and the PC5 interface use a unified QoS mechanism (the unified QoS mechanism is based on flow-based QoS). In other words, NAS layers of a terminal uniformly perform an operation of mapping a data packet (which may be an IP packet or a non-IP packet) to a quality of service flow.

Embodiment 1

Figure 2:
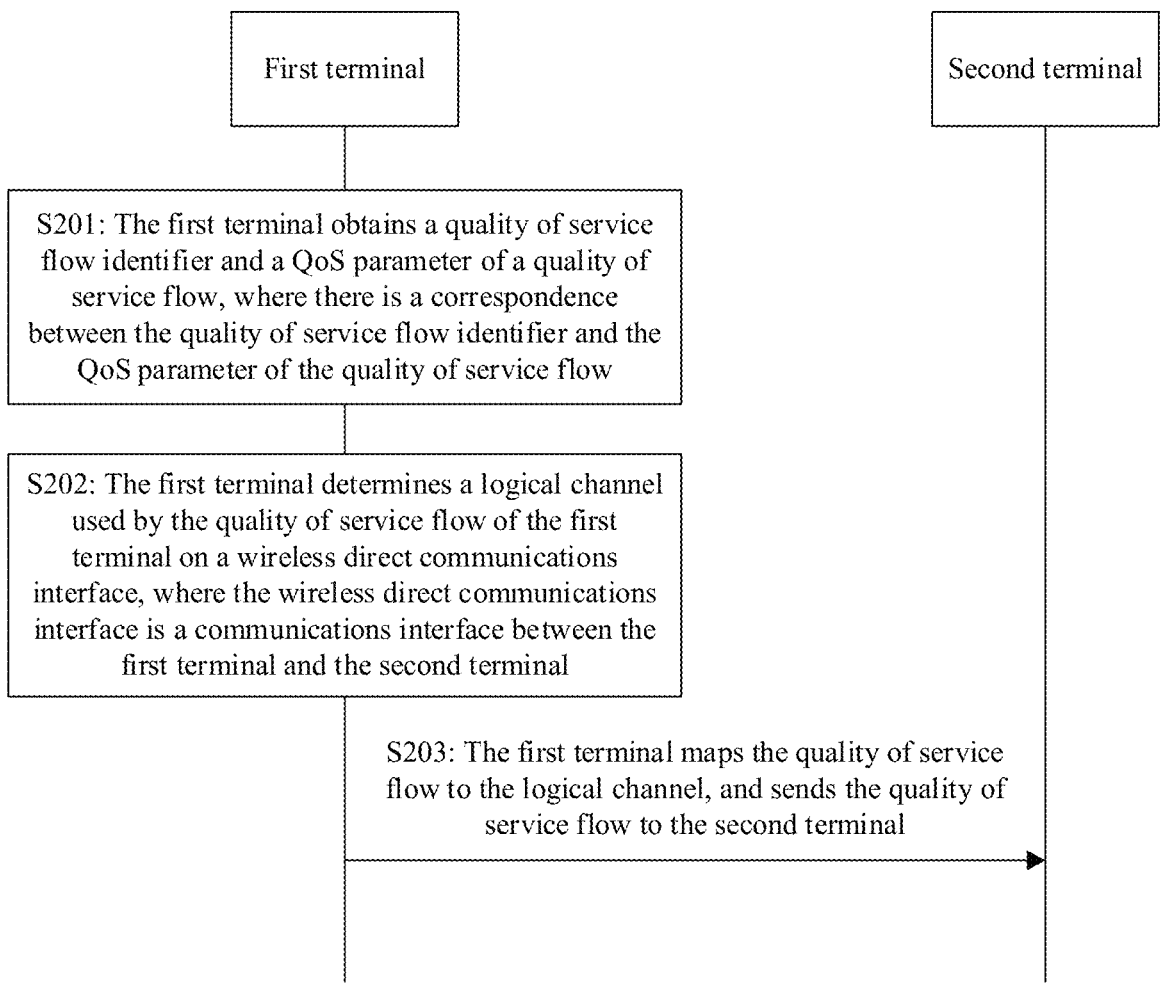
FIG. 2 is an interaction flowchart of a data transmission method according to an embodiment of this application.

FIG. 2 is an interaction flowchart of a data transmission method according to an embodiment of this application. As shown in FIG. 2, network elements involved in the method include a first terminal and a second terminal. The method includes the following steps:

Step S201: The first terminal obtains a quality of service flow identifier and a QoS parameter of the quality of service flow, where there is a correspondence between the quality of service flow identifier and the QoS parameter of the quality of service flow.

Step S202: The first terminal determines a logical channel used by the quality of service flow of the first terminal on a wireless direct communications interface, where the wireless direct communications interface is a communications interface between the first terminal and the second terminal.

Step S203: The first terminal maps the quality of service flow to the logical channel, and sends the quality of service flow to the second terminal.

Optionally, before step S201, the first terminal maps, at a NAS layer by using QoS rule information, a data packet received from an application layer to a quality of service flow QoS flow. The quality of service flow is associated with a quality of service flow identifier (QFI). In other words, the QFI is used to uniquely identify the quality of service flow.

Description is provided with reference to step S201 and step S202.

The first terminal determines, based on the correspondence between the quality of service flow identifier and the QoS parameter of the quality of service flow, a logical channel used on a PC5 interface.

Optionally, the first terminal determines, based on the QoS parameter of the quality of service flow, the logical channel used on the PC5 interface. For example, the first terminal configures a maximum quantity of retransmission times of the logical channel based on a packet error rate PER corresponding to the quality of service flow. In addition, the first terminal may further determine the logical channel based on other information. This is not limited in this application.

For example, the quality of service flow identifier may be a QFI. Specifically, in the field of the current communications technologies, there are two types of QoS parameters of the quality of service flow, including standardized QoS parameters and non-standardized QoS parameters. The standardized QoS parameters are shown in Table 1, and include a 5G quality identifier (5QI), a service type (a guaranteed bit rate (GBR) service or a Non-GBR service), a priority level, and a packet delay budget (PDB), a packet error rate (PER), a maximum data burst volume, an averaging window, and the like. In other words, the first terminal can learn, based on 5QI parameters and by using Table 1, other QoS parameters corresponding to the service. The non-standardized QoS parameters may be defined by an operator, and a network side needs to explicitly indicate a specific QoS parameter to a terminal. The specific QoS parameter includes at least one of the following parameters: a 5QI, a priority level, a PDB, a PER, and the like.

TABLE 1

| | | Standardized QoS parameters | | | | | |
|---|---|---|---|---|---|---|---|
| 5G quality identifier | Resource type | Default priority level | Packet delay budget | Packet error rate | Default maximum data burst volume | Default averaging window | Service example |
| 10 | Delay-sensitive guaranteed bit rate service | 11 | 5 ms | $10^{-5}$ | 160 B | To be determined | Remote control |
| 11 | | 12 | 10 ms | $10^{-5}$ | 320 B | To be determined | Intelligent transmission system |

For the standardized QoS parameters, the correspondence between the quality of service flow identifier and the QoS parameter of the quality of service flow includes: a correspondence between the quality of service flow identifier and a standard 5QI.

For the non-standardized QoS parameters, the correspondence between the quality of service flow identifier and the QoS parameter of the quality of service flow includes: a correspondence between the quality of service flow identifier and at least one QoS parameter of a priority, a PDB, and a PER of the quality of service flow.

The quality of service flow identifier and the QoS parameter of the quality of service flow may be obtained by the first terminal by using a radio resource control (RRC) message sent by a radio access network device or by using a NAS message sent by an access and mobility management function (AMF) entity.

Optionally, the method further includes: The first terminal obtains the quality of service flow identifier and at least one quality parameter of a guaranteed bit rate (GBR) and a maximum bit rate (MBR) of the quality of service flow, where there is a correspondence between the quality of service flow identifier and the at least one quality parameter, or the first terminal obtains a quality identifier of the quality of service flow and at least one quality parameter of a GBR and an MBR of the quality of service flow, where there is a correspondence between the quality identifier of the quality of service flow and the at least one quality parameter, to control a rate at which the GBR quality of service flow is sent to the second terminal.

Optionally, the method further includes: The first terminal obtains an aggregate maximum bit rate (AMBR) of the first terminal, to control a sum of rates at which all Non-GBR quality of service flows are sent to the second terminal.

The first terminal may learn the QFI and the at least one quality parameter of the GBR and the MBR, and/or learn the AMBR of the first terminal by using the RRC message sent by the radio access network device or by using the NAS message sent by the AMF entity.

Optionally, before step S203, the method further includes: The first terminal determines a priority of a logical channel based on a priority corresponding to the quality of service flow. Specifically, the first terminal uses the priority of the quality of service flow as the priority (for example, as an absolute priority or a relative priority) of the logical channel. Alternatively, the first terminal obtains a priority of the logical channel from the radio access network device. To be specific, the radio access network device configures the priority of the logical channel for the first terminal.

Optionally, the method further includes: The first terminal obtains a QFI of a quality of service flow and an identifier of a logical channel group (LCG) on the PC5 interface that are sent by the radio access network device, where there is a correspondence between the quality of service flow identifier and the identifier of the LCG, so that the first terminal counts, based on the correspondence between the QFI of the quality of service flow and the identifier of the LCG on the PC5 interface, a service volume of the QFI of the quality of service flow into a service volume of the corresponding LCG, and sends a buffer status report (BSR) to an access side device, to request a scheduling resource on the PC5 interface.

Alternatively, the first terminal obtains an identifier of a logical channel on the PC5 interface and an identifier of a LCG that are sent by the radio access network device, where there is a correspondence between the identifier of the logical channel and the identifier of the LCG, so that the first terminal counts, based on the correspondence between the identifier of the logical channel on the PC5 interface and the identifier of the LCG, a service volume transmitted on the logical channel into a service volume of the corresponding LCG, and sends a BSR to an access side device, to request a scheduling resource on the PC5 interface.

Alternatively, the first terminal obtains a quality identifier of a quality of service flow and an identifier of an LCG on the PC5 interface that are sent by the radio access network device, where there is a correspondence between the 5QI and the identifier of the LCG, so that the first terminal counts, based on the correspondence between the 5QI of the quality of service flow and the identifier of the LCG on the PC5 interface, a service volume of the 5QI of the quality of service flow into a service volume of the corresponding LCG, and sends a BSR to an access side device, to request a scheduling resource on the PC5 interface.

The BSR carries to-be-sent service volumes reported by the first terminal to the radio access network device, and the first terminal reports the to-be-sent service volumes based on different LCGs. In other words, the BSR carries service volumes corresponding to different LCGs.

Optionally, when the first terminal communicates with both the radio access network device and the second terminal, before step S203, the method further includes: The first terminal obtains a preset value. Correspondingly, step S203 includes: If at least one of the QFI of the quality of service flow, the priority of the quality of service flow, and the 5QI of the quality of service flow is less than or equal to the preset value, the first terminal preferentially sends the quality of service flow to the second terminal through the logical channel on the PC5 interface. The preset value may be obtained by using a system broadcast message, an RRC reconfiguration message, or a preconfiguration manner.

Optionally, the preset value may be set based on an actual situation. This is not limited in this embodiment of this application Optionally, before step S203, the method further includes: The first terminal sends sidelink control information (SCI) on the PC5 interface to the second terminal, where the SCI includes at least one of the following parameters: the QFI of the quality of service flow and the 5QI of the quality of service flow, so that the second terminal senses a service situation on the PC5 interface.

Optionally, the method further includes: The first terminal sends, to the radio access network device, at least one of the following: the QFI of the quality of service flow and the 5QI of the quality of service flow, so that the radio access network device determines a service characteristic transmitted by the first terminal on the logical channel of the PC5 interface, to determine whether a semi-persistent scheduling resource needs to be allocated to the first terminal on the PC5 interface. For example, for a service with a relatively fixed service scheduling period, semi-persistent scheduling may be used. To be specific, the radio access network device needs to allocate a resource only once, and the first terminal may periodically use the allocated resource, thereby preventing the radio access network device from allocating the resource to the first terminal each time.

In this embodiment, there are two implementation methods for all related information that is used for the PC5 interface and that is obtained by the first terminal from the radio access network device. Method 1: The radio access network device adds one piece of interface indication information to an RRC message sent to the first terminal, to indicate whether information carried in the RRC message is used for the PC5 interface. Method 2: The radio access network device scrambles an RRC message sent to the first terminal by using a sidelink-radio network temporary identifier (SL-RNTI) (a unique identifier of the first terminal on the PC5 interface), so that the first terminal learns whether information carried in the RRC message is used for the PC5 interface.

In conclusion, this embodiment of this application provides a data transmission method. A unified QoS mechanism is used on a Uu interface and a PC5 interface. To be specific, the first terminal obtains a quality of service flow identifier of the first terminal and a QoS parameter of a quality of service flow, where there is a correspondence between the quality of service flow identifier and the QoS parameter of the quality of service flow, and determines, based on the QoS parameter, a logical channel used by the quality of service flow on the PC5 interface. The first terminal maps the quality of service flow to the determined logical channel, and sends the quality of service flow to the second terminal. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

Embodiment 2

Figure 3:
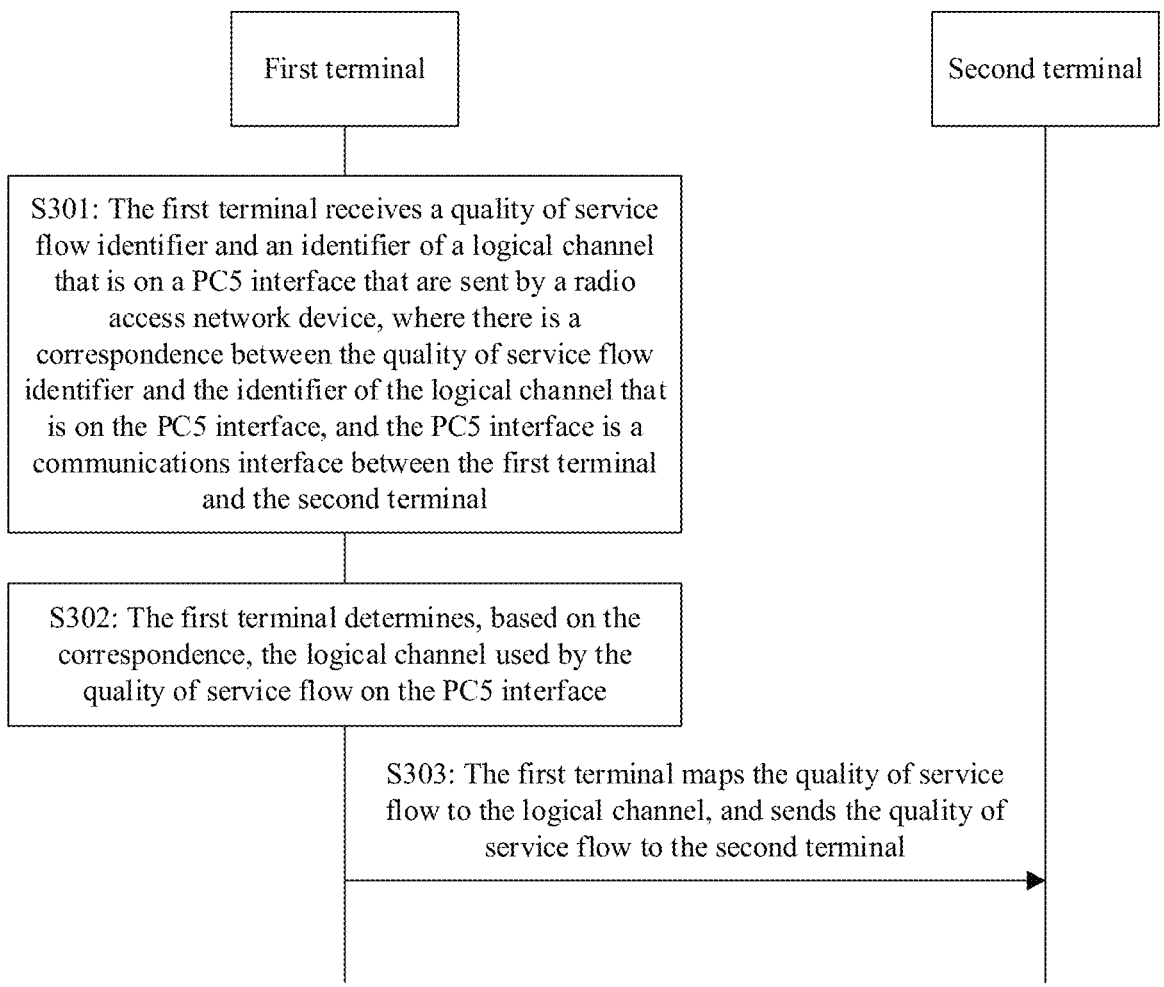
FIG. 3 is an interaction flowchart of a data transmission method according to another embodiment of this application.

FIG. 3 is an interaction flowchart of a data transmission method according to another embodiment of this application. As shown in FIG. 3, network elements involved in the method include a first terminal, a radio access network device, and a second terminal. The method includes the following steps:

Step S301: The first terminal receives a quality of service flow identifier and an identifier of a logical channel on a PC5 interface that are sent by the radio access network device, where there is a correspondence between the quality of service flow identifier and the identifier of the logical channel on the PC5 interface, and the PC5 interface is a communications interface between the first terminal and the second terminal.

Step S302: The first terminal determines, based on the correspondence, the logical channel used by the quality of service flow on the PC5 interface.

Step S303: The first terminal maps the quality of service flow to the logical channel, and sends the quality of service flow to the second terminal.

Optionally, before step S301, the first terminal maps, at a NAS layer by using QoS rule information, a data packet received from an application layer to a quality of service flow QoS flow. The quality of service flow is associated with a QFI. In other words, the QFI is used to uniquely identify the quality of service flow.

It should be noted that the correspondence between the quality of service flow identifier and the identifier of the logical channel on the PC5 interface is not limited to a correspondence between the QFI of the quality of service flow and the identifier of the logical channel. For example, the correspondence between the quality of service flow of the first terminal and the logical channel on the PC5 interface includes a correspondence between a 5QI of the quality of service flow and the identifier of the logical channel, where the 5QI corresponds to the QFI of the quality of service flow.

Description is provided with reference to step S302 and step S303.

For example, the first terminal may map a quality of service flow 1 corresponding to a QFI 1 to a logical channel 1 on the PC5 interface, and map a quality of service flow 2 corresponding to a QFI 2 to a logical channel 2 on the PC5 interface.

Optionally, the method further includes: The first terminal obtains the QFI of the quality of service flow and at least one quality parameter of a GBR and an MBR of the quality of service flow, where there is a correspondence between the quality of service flow identifier and the at least one quality parameter, to control a rate at which the GBR quality of service flow is sent to the second terminal. Alternatively, the first terminal obtains a 5G quality identifier of the quality of service flow and at least one quality parameter of a GBR and an MBR of the quality of service flow, where there is a correspondence between the 5G quality identifier of the quality of service flow and the at least one quality parameter, to control a rate at which the GBR quality of service flow is sent to the second terminal.

Optionally, the method further includes: The first terminal obtains an AMBR of the first terminal, to control a sum of rates at which all Non-GBR quality of service flows are sent to the second terminal.

The first terminal may learn the QFI and the at least one quality parameter of the GBR and the MBR, and/or learn the AMBR of the first terminal by using an RRC message sent by the radio access network device or by using a NAS message sent by an AMF entity.

Optionally, before step S303, the method further includes: The first terminal determines a priority of the logical channel based on a priority of the quality of service flow. Specifically, the first terminal uses the priority of the quality of service flow as the priority (for example, as an absolute priority or a relative priority) of the logical channel. Alternatively, the first terminal obtains a priority of the logical channel from the radio access network device. To be specific, the radio access network device configures the priority of the logical channel for the first terminal.

Optionally, the method further includes: The first terminal obtains a QFI and an identifier of an LCG on the PC5 interface that are sent by the radio access network device, where there is a correspondence between the quality of service flow identifier and the identifier of the LCG, so that the first terminal counts, based on the correspondence between the QFI of the quality of service flow and the identifier of the LCG on the PC5 interface, a service volume of the QFI of the quality of service flow into a service volume of the corresponding LCG, and sends a BSR to an access side device, to request a scheduling resource on the PC5 interface.

Alternatively, the first terminal obtains an identifier of a logical channel on the PC5 interface and an identifier of a LCG that are sent by the radio access network device, where there is a correspondence between the identifier of the logical channel and the identifier of the LCG, so that the first terminal counts, based on the correspondence between the identifier of the logical channel on the PC5 interface and the identifier of the LCG, a service volume transmitted on the logical channel into a service volume of the corresponding LCG, and sends a BSR to an access side device, to request a scheduling resource on the PC5 interface.

Alternatively, the first terminal obtains a 5QI of the quality of service flow and an identifier of an LCG on the PC5 interface that are sent by the radio access network device, where there is a correspondence between the 5QI and the identifier of the LCG, so that the first terminal counts, based on the correspondence between the 5QI of the quality of service flow and the identifier of the LCG on the PC5 interface, a service volume of the 5QI of the quality of service flow into a service volume of the corresponding LCG, and sends a BSR to an access side device, to request a scheduling resource on the PC5 interface.

The BSR carries to-be-sent service volumes reported by the first terminal to the radio access network device, and the first terminal reports the to-be-sent service volumes based on different LCGs. In other words, the BSR carries service volumes corresponding to different LCGs.

Optionally, when the first terminal communicates with both the radio access network device and the second terminal, before step S303, the method further includes: The first terminal obtains a preset value. Correspondingly, step S303 includes: If at least one of the QFI of the quality of service flow, the priority of the quality of service flow, and the 5QI of the quality of service flow is less than or equal to the preset value, the first terminal preferentially sends the quality of service flow to the second terminal through the logical channel on the PC5 interface. The preset value is obtained by using a system broadcast message, an RRC reconfiguration message, or a preconfiguration manner. Optionally, the preset value may be set based on an actual situation. This is not limited in this embodiment of this application.

Optionally, before step S303, the method further includes: The first terminal sends SCI on the PC5 interface to the second terminal, where the SCI includes at least one of the following parameters: the QFI of the quality of service flow and the 5QI of the quality of service flow, so that the second terminal senses a service situation on the PC5 interface.

Optionally, the method further includes: The first terminal sends, to the radio access network device, at least one of the following: the QFI of the quality of service flow and the 5QI of the quality of service flow, so that the radio access network device determines a service characteristic transmitted by the first terminal on the logical channel of the PC5 interface, to determine whether a semi-persistent scheduling resource needs to be allocated to the first terminal on the PC5 interface. For example, for a service with a relatively fixed service scheduling period, semi-persistent scheduling may be used. To be specific, the radio access network device needs to allocate a resource only once, and the first terminal may periodically use the allocated resource, thereby preventing the radio access network device from allocating the resource to the first terminal each time.

In this embodiment, there are two implementation methods for all related information that is used for the PC5 interface and that is obtained by the first terminal from the radio access network device. Method 1: The radio access network device adds one piece of interface indication information to an RRC message sent to the first terminal, to indicate whether information carried in the RRC message is used for the PC5 interface. Method 2: The radio access network device scrambles an RRC message sent to the first terminal by using an SL-RNTI (a unique identifier of the first terminal on the PC5 interface), so that the first terminal learns whether information carried in the RRC message is used for the PC5 interface.

In conclusion, this embodiment of this application provides a data transmission method. A unified QoS mechanism is used on a Uu interface and a PC5 interface. To be specific, the first terminal obtains a quality of service flow identifier of the first terminal and an identifier of a logical channel on the PC5 interface that are sent by the radio access network device, where there is a correspondence between the quality of service flow identifier and the identifier of the logical channel on the PC5 interface. The first terminal determines, based on the correspondence, the logical channel used by the quality of service flow on the PC5 interface. The first terminal maps the quality of service flow to the logical channel, and sends the quality of service flow to the second terminal. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

Embodiment 3

Figure 4:
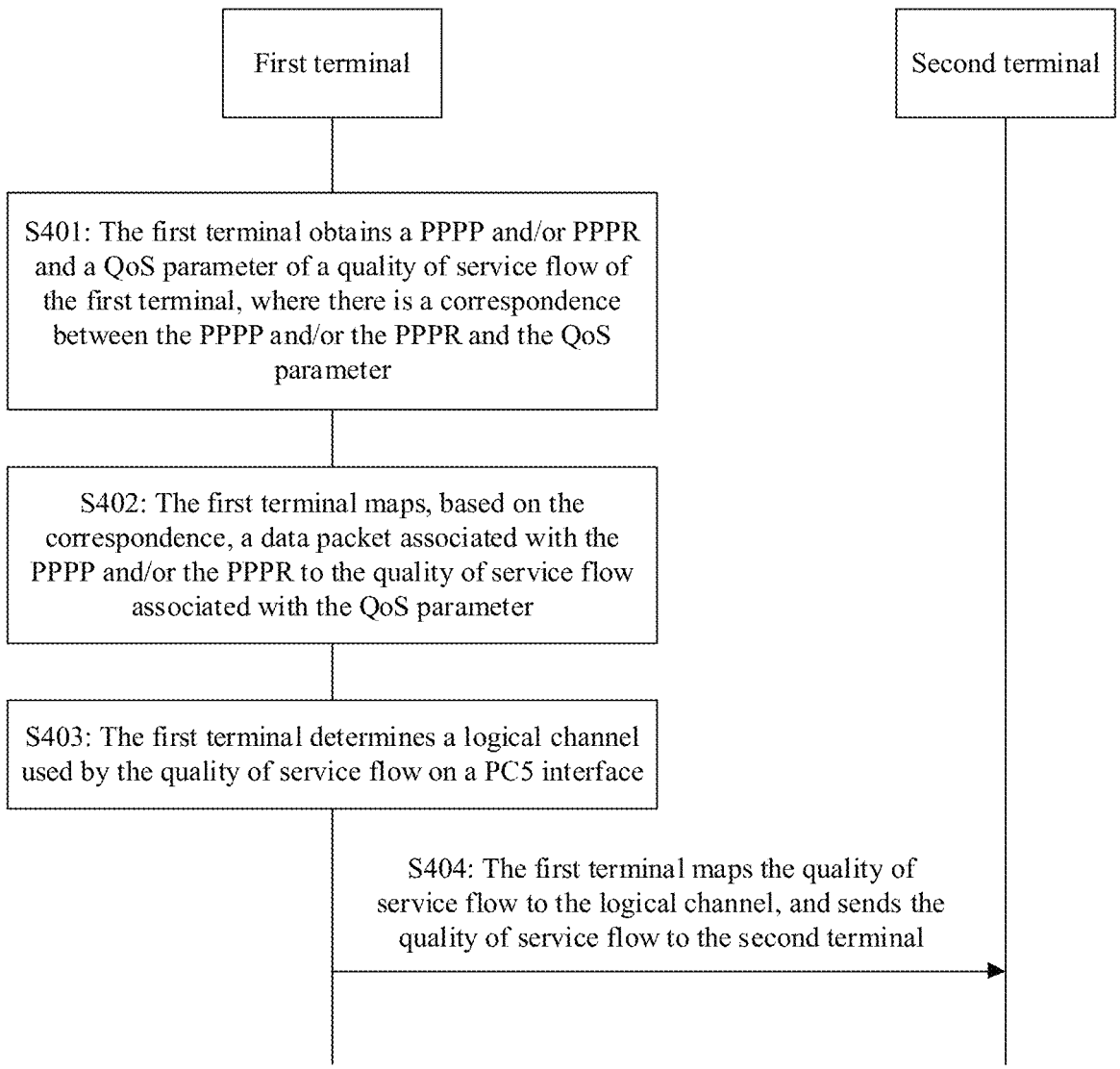
FIG. 4 is an interaction flowchart of a data transmission method according to still another embodiment of this application.

FIG. 4 is an interaction flowchart of a data transmission method according to still another embodiment of this application. As shown in FIG. 4, network elements involved in the method include a first terminal and a second terminal. The method includes the following steps:

Step S401: The first terminal obtains a PPPP and/or a PPPR and a QoS parameter of a quality of service flow of the first terminal, where there is a correspondence between the PPPP and/or the PPPR and the QoS parameter.

Step S402: The first terminal maps, based on the correspondence, a data packet associated with the PPPP and/or the PPPR to the quality of service flow associated with the QoS parameter.

Step S403: The first terminal determines a logical channel used by the quality of service flow on a PC5 interface.

Step S404: The first terminal maps the quality of service flow to the logical channel, and sends the quality of service flow to the second terminal.

A data packet received by the first terminal device from an application layer is associated with the PPPP and/or the PPPR, and then, based on the correspondence obtained in step S401, the first terminal device may map, at a NAS layer, the data packet associated with the PPPP and/or the PPPR to the quality of service flow QoS flow associated with the QoS parameter.

As described in Embodiment 1, in the field of the current communications technologies, there are two types of QoS parameters, including: standardized QoS parameters and non-standardized QoS parameters. The standardized QoS parameters are shown in Table 1, and include: a 5QI, a service type (a GBR service or a Non-GBR service), a priority level, a packet delay budget (PDB), and a packet error rate (PER), a maximum data burst volume, an averaging window, and the like. In other words, the first terminal can learn, based on 5QI parameters and by using Table 1, other QoS parameters corresponding to the service. The non-standardized QoS parameters may be defined by an operator, and a network side needs to explicitly indicate a specific QoS parameter to a terminal. The specific QoS parameter includes at least one of the following parameters: a 5QI, a priority level, a PDB, a PER, and the like.

For the standardized QoS parameters, the correspondence between the PPPP and/or the PPPR and the QoS parameter of the quality of service flow of the first terminal includes: a correspondence between the PPPP and/or the PPPR and a 5QI of the quality of service flow, or a correspondence between the PPPP and/or the PPPR and a quality of service flow identifier QFI. In this case, the first terminal further needs to obtain a correspondence between the QFI and the 5QI, so that the first terminal maps the data packet associated with the PPPP and/or the PPPR into a QoS flow associated with the 5QI.

For the non-standardized QoS parameters, the correspondence between the PPPP and/or the PPPR and the QoS parameter of the quality of service flow of the first terminal includes: a correspondence between the PPPP and/or the PPPR and at least one quality parameter a priority, a PDB, and a PER of the quality of service flow.

Optionally, the correspondence between the PPPP and/or the PPPR and the QoS parameter of the quality of service flow of the first terminal may be obtained by using a DRB with a radio access network device, or may be obtained by using an RRC message with a radio access network device, or may be obtained by using a NAS message with a core network device.

Optionally, the correspondence between the PPPP and/or the PPPR and the QoS parameter of the quality of service flow of the first terminal is obtained after a V2X control functional entity in a near-end communications system negotiates with a packet control function (PCF) entity in a 3GPP system.

Optionally, the method further includes: The first terminal obtains the QFI of the quality of service flow and at least one quality parameter of a GBR and an MBR of the quality of service flow, where there is a correspondence between the QFI and the at least one quality parameter, to control a rate at which the GBR quality of service flow is sent to the second terminal. Alternatively, the first terminal obtains a 5QI of the quality of service flow and at least one quality parameter of a GBR and an MBR of the quality of service flow, where there is a correspondence between the 5QI of the quality of service flow and the at least one quality parameter, to control a rate at which the GBR quality of service flow is sent to the second terminal.

Optionally, the method further includes: The first terminal obtains an AMBR of the first terminal, to control a sum of rates at which all Non-GBR quality of service flows are sent to the second terminal.

The first terminal may learn the QFI and the at least one quality parameter of the GBR and the MBR, and/or learn the AMBR of the first terminal by using an RRC message sent by the radio access network device or by using a NAS message sent by an AMF entity.

Optionally, before step S403, the method further includes: The first terminal determines a priority of the logical channel based on a priority of the quality of service flow. Specifically, the first terminal uses the priority (for example, as an absolute priority or a relative priority) of the quality of service flow as the priority of the logical channel. Alternatively, the first terminal obtains a priority of the logical channel from the radio access network device. To be specific, the radio access network device configures the priority of the logical channel for the first terminal.

Optionally, the method further includes: The first terminal obtains a QFI and an identifier of an LCG on the PC5 interface that are sent by the radio access network device, where there is a correspondence between the quality of service flow identifier and the identifier of the LCG, so that the first terminal counts, based on the correspondence between the QFI of the quality of service flow and the identifier of the LCG on the PC5 interface, a service volume of the QFI of the quality of service flow into a service volume of the corresponding LCG, and sends a BSR to an access side device, to request a scheduling resource on the PC5 interface Alternatively, the first terminal obtains an identifier of a logical channel on the PC5 interface and an identifier of a logical channel group LCG that are sent by the radio access network device, where there is a correspondence between the identifier of the logical channel and the identifier of the LCG, so that the first terminal counts, based on the correspondence between the identifier of the logical channel on the PC5 interface and the identifier of the LCG, a service volume transmitted on the logical channel into a service volume of the corresponding LCG, and sends a BSR to an access side device, to request a scheduling resource on the PC5 interface.

Alternatively, the first terminal obtains a 5QI of the quality of service flow and an identifier of an LCG on the PC5 interface that are sent by the radio access network device, where there is a correspondence between the 5QI and the identifier of the LCG, so that the first terminal counts, based on the correspondence between the 5QI of the quality of service flow and the identifier of the LCG on the PC5 interface, a service volume of the 5QI of the quality of service flow into a service volume of the corresponding LCG, and sends a BSR to an access side device, to request a scheduling resource on the PC5 interface.

The BSR carries to-be-sent service volumes reported by the first terminal to the radio access network device, and the first terminal reports the to-be-sent service volumes based on different LCGs. In other words, the BSR carries service volumes corresponding to different LCGs.

Optionally, when the first terminal communicates with both the radio access network device and the second terminal, before step S403, the method further includes: The first terminal obtains a preset value. Correspondingly, step S403 includes: If at least one of the QFI of the quality of service flow, the priority of the quality of service flow, and the 5QI of the quality of service flow is less than or equal to the preset value, the first terminal preferentially sends the quality of service flow to the second terminal through the logical channel on the PC5 interface. The preset value is obtained by using a system broadcast message, an RRC reconfiguration message, or a preconfiguration manner. Optionally, the preset value may be set based on an actual situation. This is not limited in this embodiment of this application Optionally, before step S403, the method further includes: The first terminal sends SCI on the PC5 interface to the second terminal, where the SCI includes at least one of the following parameters: the QFI of the quality of service flow and the 5QI of the quality of service flow, so that the second terminal senses a service situation on the PC5 interface.

Optionally, the method further includes: The first terminal sends, to the radio access network device, at least one of the following: the QFI of the quality of service flow and the 5QI of the quality of service flow, so that the radio access network device determines a service characteristic transmitted by the first terminal on the logical channel of the PC5 interface, to determine whether a semi-persistent scheduling resource needs to be allocated to the first terminal on the PC5 interface. For example, for a service with a relatively fixed service scheduling period, semi-persistent scheduling may be used. To be specific, the radio access network device needs to allocate a resource only once, and the first terminal may periodically use the allocated resource, thereby preventing the radio access network device from allocating the resource to the first terminal each time.

In this embodiment, there are two implementation methods for all related information that is used for the PC5 interface and that is obtained by the first terminal from the radio access network device. Method 1: The radio access network device adds one piece of interface indication information to an RRC message sent to the first terminal, to indicate whether information carried in the RRC message is used for the PC5 interface. Method 2: The radio access network device scrambles an RRC message sent to the first terminal by using an SL-RNTI (a unique identifier of the first terminal on the PC5 interface), so that the first terminal learns whether information carried in the RRC message is used for the PC5 interface.

In conclusion, this embodiment of this application provides a data transmission method. A unified QoS mechanism is used on a Uu interface and a PC5 interface. To be specific, the first terminal obtains a PPPP and/or a PPPR and a QoS parameter of a quality of service flow of the first terminal, where there is a correspondence between the PPPP and/or the PPPR and the QoS parameter of the quality of service flow. The first terminal maps, based on the correspondence, a data packet associated with the PPPP and/or the PPPR to the QoS flow associated with the QoS parameter. The first terminal maps the quality of service flow to the logical channel, and sends the quality of service flow to the second terminal. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

Embodiment 4

Figure 5:
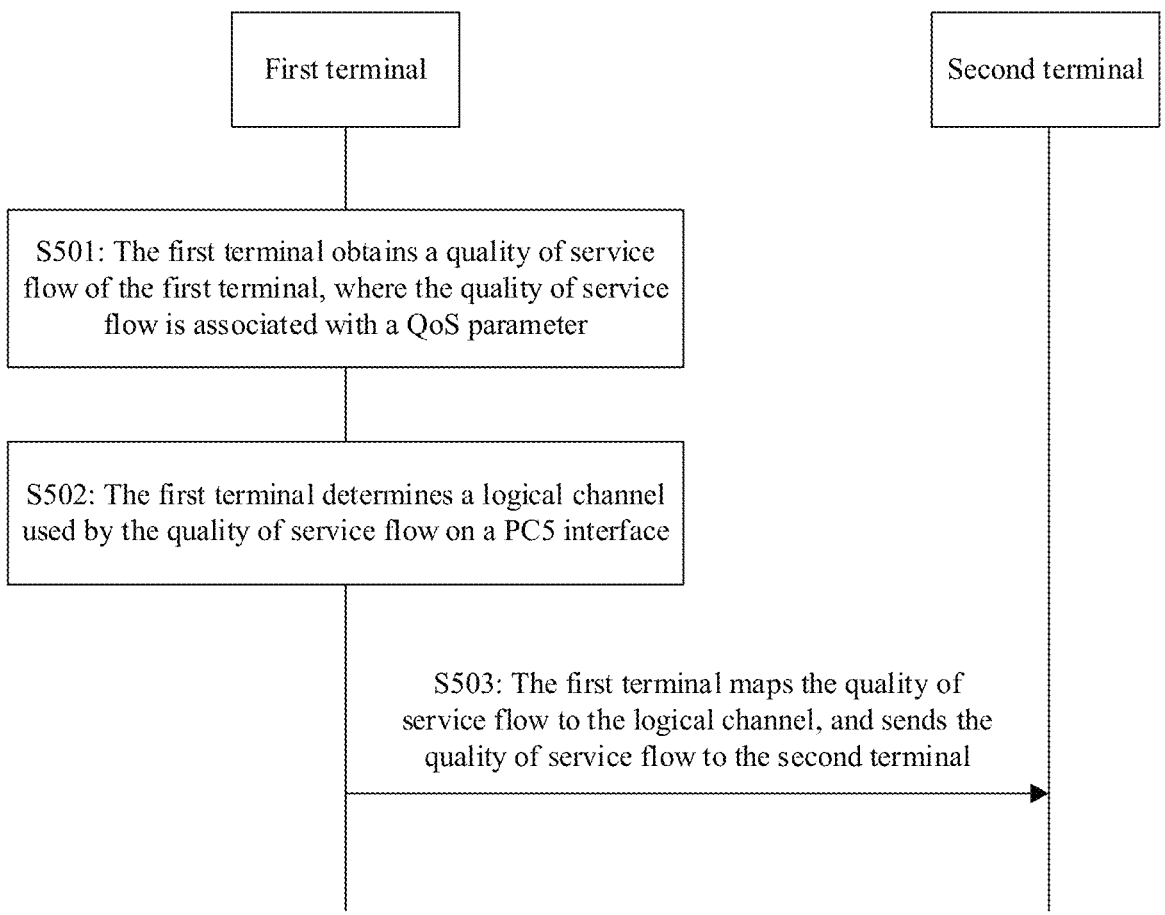
FIG. 5 is an interaction flowchart of a data transmission method according to yet another embodiment of this application.

FIG. 5 is an interaction flowchart of a data transmission method according to yet another embodiment of this application. As shown in FIG. 5, network elements involved in the method include a first terminal and a second terminal. The method includes the following steps:

Step S501: The first terminal obtains a quality of service flow of the first terminal, where the quality of service flow is associated with a QoS parameter.

Step S502: The first terminal determines a logical channel used by the quality of service flow on a PC5 interface.

Step S503: The first terminal maps the quality of service flow to the logical channel, and sends the quality of service flow to the second terminal.

A difference between Embodiment 4 and Embodiment 1 lies in: In Embodiment 4, a data packet obtained by the first terminal from an application layer has been associated with the QoS parameter. Specifically, the first terminal may have mapped, at the application layer, a data packet associated with a PPPP and/or a PPPR into a data packet related to a 5QI, or the first terminal may directly associate a data packet with a 5QI at the application layer.

Description is provided with reference to step S501 and step S502.

As described in Embodiment 1, in the field of the current communications technologies, there are two types of QoS parameters, including: standardized QoS parameters and non-standardized QoS parameters. The standardized QoS parameters are shown in Table 1, and further include: a 5QI, a service type (a GBR service or a Non-GBR service), a priority level, a packet delay budget (PDB), and a packet error rate (PER), a maximum data burst volume, an averaging window, and the like. In other words, the first terminal can learn, based on 5QI parameters and by using Table 1, other QoS parameters corresponding to the service. The non-standardized QoS parameters may be defined by an operator, and a network side needs to explicitly indicate a specific QoS parameter to a terminal. The specific QoS parameter includes at least one of the following parameters: a 5QI, a priority level, a PDB, a PER, and the like.

For the standardized QoS parameters, that the quality of service flow is associated with a QoS parameter includes: The quality of service flow is associated with a 5QI.

For the non-standardized QoS parameters, that the quality of service flow is associated with a QoS parameter includes: The quality of service flow is associated with at least one quality parameter of a priority, a PDB, and a PER of the quality of service flow.

Optionally, the method further includes: The first terminal obtains the QFI of the quality of service flow and at least one quality parameter of a GBR and an MBR of the quality of service flow, where there is a correspondence between the QFI and the at least one quality parameter, to control a rate at which the GBR quality of service flow is sent to the second terminal. Alternatively, the first terminal obtains a 5G quality identifier 5QI of the quality of service flow and at least one quality parameter of a GBR and an MBR of the quality of service flow, where there is a correspondence between the 5G quality identifier 5QI of the quality of service flow and the at least one quality parameter, to control a rate at which the GBR quality of service flow is sent to the second terminal.

Optionally, the method further includes: The first terminal obtains an AMBR of the first terminal, to control a sum of rates at which all Non-GBR quality of service flows are sent to the second terminal.

The first terminal may learn the QFI and the at least one quality parameter of the GBR and the MBR, and/or learn the AMBR of the first terminal by using an RRC message sent by the radio access network device or by using a NAS message sent by an AMF entity.

Optionally, before step S503, the method further includes: The first terminal determines a priority of the logical channel based on a priority of the quality of service flow. Specifically, the first terminal uses the priority of the quality of service flow as the priority (for example, as an absolute priority or a relative priority) of the logical channel. Alternatively, the first terminal obtains a priority of the logical channel from the radio access network device. To be specific, the radio access network device configures the priority of the logical channel for the first terminal.

Optionally, the method further includes: The first terminal obtains a QFI and an identifier of an LCG on the PC5 interface that are sent by the radio access network device, where there is a correspondence between the quality of service flow identifier and the identifier of the LCG, so that the first terminal counts, based on the correspondence between the QFI of the quality of service flow and the identifier of the LCG on the PC5 interface, a service volume of the QFI of the quality of service flow into a service volume of the corresponding LCG, and sends a BSR to an access side device, to request a scheduling resource on the PC5 interface.

Alternatively, the first terminal obtains an identifier of a logical channel on the PC5 interface and an identifier of a logical channel group LCG that are sent by the radio access network device, where there is a correspondence between the identifier of the logical channel and the identifier of the LCG, so that the first terminal counts, based on the correspondence between the identifier of the logical channel on the PC5 interface and the identifier of the LCG, a service volume transmitted on the logical channel into a service volume of the corresponding LCG, and sends a BSR to an access side device, to request a scheduling resource on the PC5 interface.

Alternatively, the first terminal obtains a 5QI of the quality of service flow and an identifier of an LCG on the PC5 interface that are sent by the radio access network device, where there is a correspondence between the 5QI and the identifier of the LCG, so that the first terminal counts, based on the correspondence between the 5QI of the quality of service flow and the identifier of the LCG on the PC5 interface, a service volume of the 5QI of the quality of service flow into a service volume of the corresponding LCG, and sends a BSR to an access side device, to request a scheduling resource on the PC5 interface.

The BSR carries to-be-sent service volumes reported by the first terminal to the radio access network device, and the first terminal reports the to-be-sent service volumes based on different LCGs. In other words, the BSR carries service volumes corresponding to different LCGs.

Optionally, when the first terminal communicates with both the radio access network device and the second terminal, before step S503, the method further includes: The first terminal obtains a preset value. Correspondingly, step S503 includes: If at least one of the QFI of the quality of service flow, the priority of the quality of service flow, and the 5QI of the quality of service flow is less than or equal to the preset value, the first terminal preferentially sends the quality of service flow to the second terminal through the logical channel on the PC5 interface. The preset value is obtained by using a system broadcast message, an RRC reconfiguration message, or a preconfiguration manner. Optionally, the preset value may be set based on an actual situation. This is not limited in this embodiment of this application.

Optionally, before step S503, the method further includes: The first terminal sends SCI on the PC5 interface to the second terminal, where the SCI includes at least one of the following parameters: the QFI of the quality of service flow and the 5QI of the quality of service flow, so that the second terminal senses a service situation on the PC5 interface.

Optionally, the method further includes: The first terminal sends, to the radio access network device, at least one of the following: the QFI of the quality of service flow and the 5QI of the quality of service flow, so that the radio access network device determines a service characteristic transmitted by the first terminal on the logical channel of the PC5 interface, to determine whether a semi-persistent scheduling resource needs to be allocated to the first terminal on the PC5 interface. For example, for a service with a relatively fixed service scheduling period, semi-persistent scheduling may be used. To be specific, the radio access network device needs to allocate a resource only once, and the first terminal may periodically use the allocated resource, thereby preventing the radio access network device from allocating the resource to the first terminal each time.

In this embodiment, there are two implementation methods for all related information that is used for the PC5 interface and that is obtained by the first terminal from the radio access network device. Method 1: The radio access network device adds one piece of interface indication information to an RRC message sent to the first terminal, to indicate whether information carried in the RRC message is used for the PC5 interface. Method 2: The radio access network device scrambles an RRC message sent to the first terminal by using an SL-RNTI (a unique identifier of the first terminal on the PC5 interface), so that the first terminal learns whether information carried in the RRC message is used for the PC5 interface.

In this embodiment, there are two implementation methods for all related information that is used for the PC5 interface and that is obtained by the first terminal from the radio access network device. Method 1: The radio access network device adds one piece of interface indication information to an RRC message sent to the first terminal, to indicate whether information carried in the RRC message is used for the PC5 interface. Method 2: The radio access network device scrambles an RRC message sent to the first terminal by using an SL-RNTI (a unique identifier of the first terminal on the PC5 interface), so that the first terminal learns whether information carried in the RRC message is used for the PC5 interface.

In conclusion, this embodiment of this application provides a data transmission method. A unified QoS mechanism is used on a Uu interface and a PC5 interface. To be specific, the first terminal obtains a quality of service flow of the first terminal, where the quality of service flow is associated with a QoS parameter. The first terminal determines a logical channel used by the quality of service flow on the PC5 interface. The first terminal maps the quality of service flow to the logical channel, and sends the quality of service flow to the second terminal. Because QoS mechanisms on the Uu interface and the PC5 interface each are the unified QoS mechanism, when either of the Uu interface and the PC5 interface cannot continue to transmit data, the first terminal can switch the quality of service flow to another interface for transmission, to implement flexible switching of data transmission between different interfaces, and ensure that no packet loss occurs during interface switching.

Embodiment 5

Figure 6:
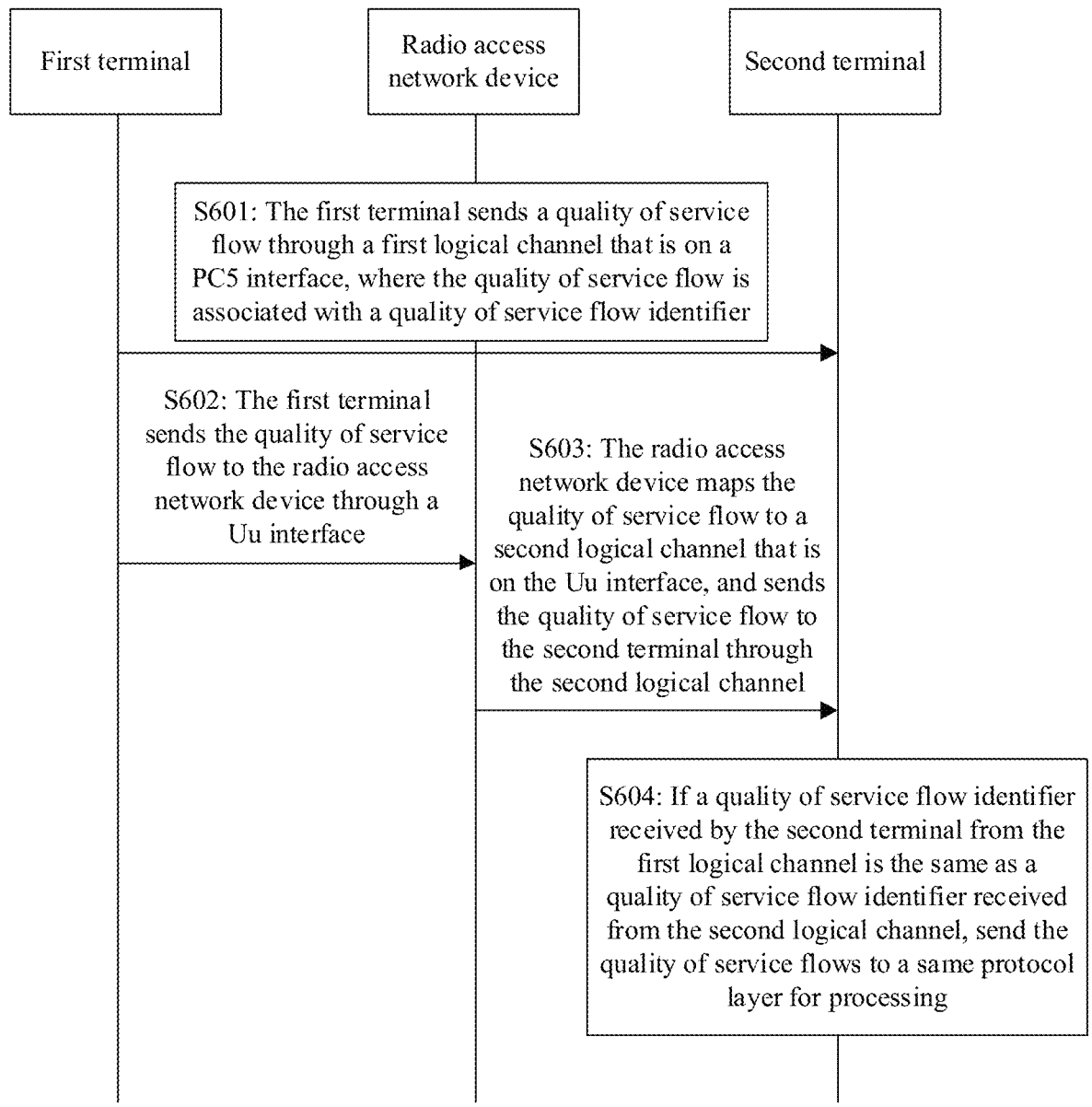
FIG. 6 is an interaction flowchart of a data transmission method according to an embodiment of this application.

FIG. 6 is an interaction flowchart of a data transmission method according to an embodiment of this application.

Figure 7:
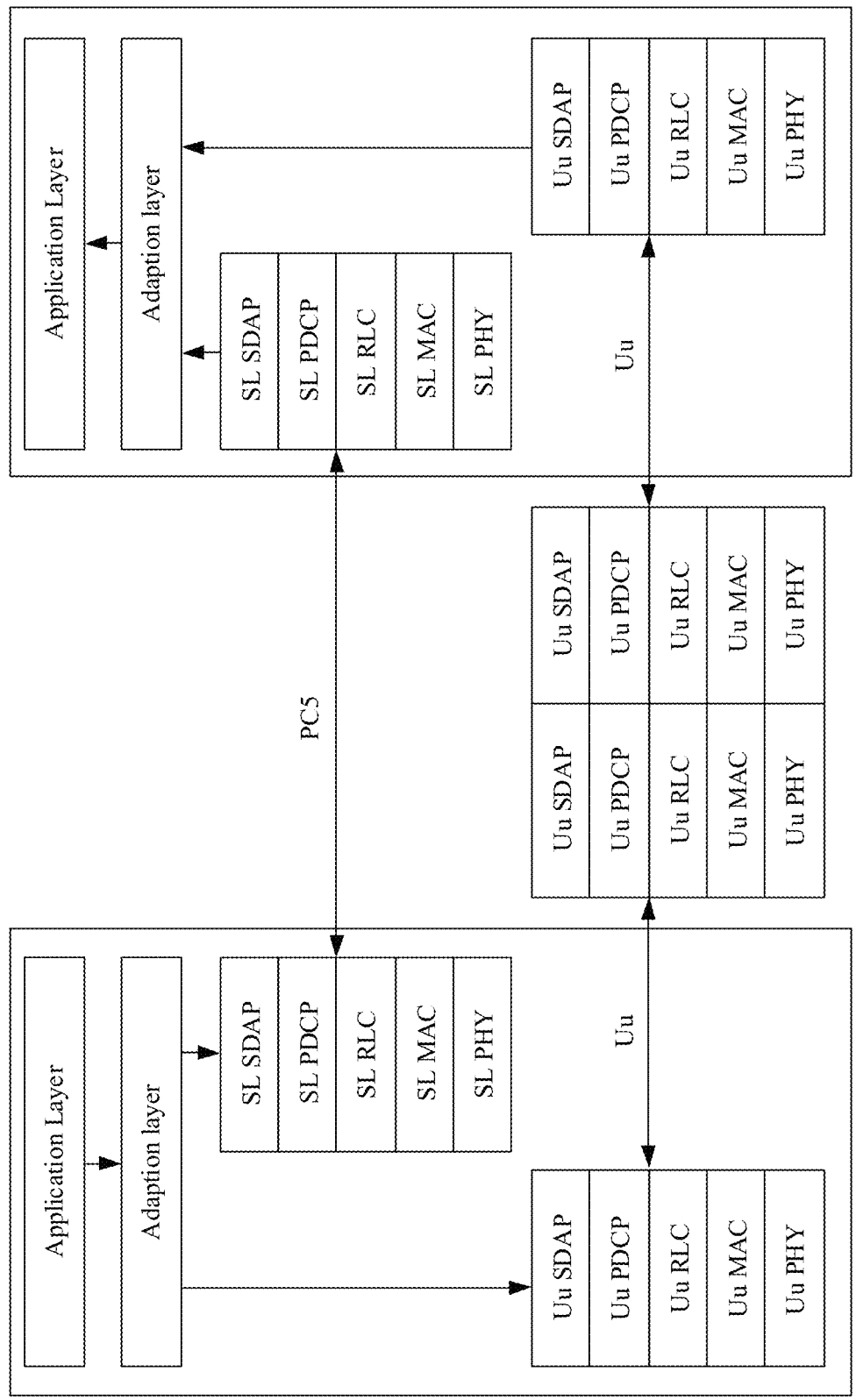
FIG. 7 is a schematic diagram of user plane protocol stacks of a Uu interface and a PC5 interface according to an embodiment of this application.

Network elements involved in the method include a first terminal, a second terminal, and a radio access network device. The first terminal and the second terminal both have a user plane protocol stack of a Uu interface and a user plane protocol stack of a PC5 interface. FIG. 7 is a schematic diagram of user plane protocol stacks of a Uu interface and a PC5 interface according to an embodiment of this application. As shown in FIG. 7, the user plane protocol stack of the PC5 interface includes a first physical (PHY) layer (also referred to as SL PHY) and a first media access control (MAC) layer (also referred to as SL MAC), a first radio link control (RLC) layer (also referred to as SL RLC), a first packet data convergence protocol (PDCP) layer (also referred to as SL PDCP), a first service data adaptation protocol (SDAP) layer (also referred to as SL SDAP), and a newly defined adaptation layer and application layer from bottom to top, and the user plane protocol stack of the Uu interface includes: a second PHY layer (also referred to as Uu PHY), a second MAC layer (also referred to as Uu MAC), a second RLC layer (also referred to as Uu RLC), a second PDCP layer (also referred to as Uu PDCP), a second SDAP layer (also referred to as Uu SDAP), the adaptation layer, and the application layer bottom to top. In conclusion, as shown in FIG. 7, one adaptation layer is introduced between a V2X application layer and an AS layer. The adaptation layer may also be referred to as an aggregation layer. This is not limited in this embodiment of this application. The adaptation layer is used to shield different interfaces of the AS layer (or shield technologies of AS layers of different interfaces). In other words, no matter which interface is selected, the same adaptation layer is used, to ensure continuity of the quality of service flows that exist before and after being switched between different interfaces.

Based on the protocol stacks shown in FIG. 7, as shown in FIG. 6, the data transmission method includes the following steps:

Step S601: The first terminal sends a quality of service flow through a first logical channel on a PC5 interface, where the quality of service flow is associated with a quality of service flow identifier.

Step S602: The first terminal sends the quality of service flow to the radio access network device through a Uu interface.

Step S603: The radio access network device maps the quality of service flow to a second logical channel on the Uu interface, and sends the quality of service flow to the second terminal through the second logical channel.

Step S604: If a quality of service flow identifier received by the second terminal from the first logical channel is the same as a quality of service flow identifier received from the second logical channel, send the quality of service flows to a same protocol layer for processing.

For example, the quality of service flow identifier may be a QFI.

Specifically, in this embodiment of this application, an execution sequence of step S601 and step S602 and step S603 (step S602 and step S603 are used as one overall step) is not limited. If step S601 is performed before step S602 and step S603, it indicates that the quality of service flow on the first terminal is switched from the PC5 interface to the Uu interface. If step S602 and step S603 are performed before step S601, it indicates that the quality of service flow on the first terminal is switched from the Uu interface to the PC5 interface.

Optionally, before the first terminal performs interface switching, the first terminal may separately measure the Uu interface and the PC5 interface. If the first terminal determines that an interface switching condition is met, for example, link quality of an interface for current data transmission deteriorates, and link quality of another interface is better, the first terminal sends an interface switching request message to the radio access network device, where the interface switching request message includes at least one of the following: a QFI of the quality of service flow, a packet data unit session identifier (PDU session ID), and a switching type (for example, switching from the Uu interface to the PC5 interface, or switching from the PC5 interface to the Uu interface). After receiving the interface switching request message, the radio access network device sends a switching command to the first terminal, to indicate the first terminal to switch from an original interface link to a target interface link to continue data transmission.

Further, the Uu SDAP layer needs to carry the quality of service flow identifier QFI, and perform mapping from the quality of service flow to a DRB. The SL SDAP layer is used to carry the QFI of the quality of service flow, and map the quality of service flow to the first logical channel.

When interface switching occurs on the quality of service flow sent by the first terminal to the second terminal, the second terminal needs to map same quality of service flows from different interfaces to a same adaptation layer, and process the quality of service flows. Because the Uu SDAP layer and the SL SDAP layer both may carry the quality of service flow identifier QFI, the second terminal only needs to determine that a QFI received from the first logical channel is the same as a QFI received from the second logical channel, to determine that the quality of service flow received from the first logical channel and the quality of service flow received from the second logical channel belong to a same quality of service flow.

Optionally, based on the protocol stacks shown in FIG. 7, if the QFI received by from the first logical channel is the same as the QFI received from the second logical channel, the second terminal sends the quality of service flows received from different interfaces to the same adaptation layer for processing.

Optionally, the processing on the quality of service flows includes: performing reordering processing, performing repeated packet detection processing, or the like on the quality of service flows received from different interfaces. This is not limited in this application.

This embodiment of this application provides a data transmission method. When interface switching occurs on a quality of service flow sent by the first terminal to the second terminal, the second terminal may identify, based on a QFI, whether a quality of service flow received from a first logical channel and a quality of service flow received from a second logical channel are a same quality of service flow. If the quality of service flows are the same, the second terminal sends the quality of service flows to a same protocol layer for processing, to ensure continuity of the quality of service flows that exist before and after being switched between different interfaces.

Embodiment 6

Figure 8A:
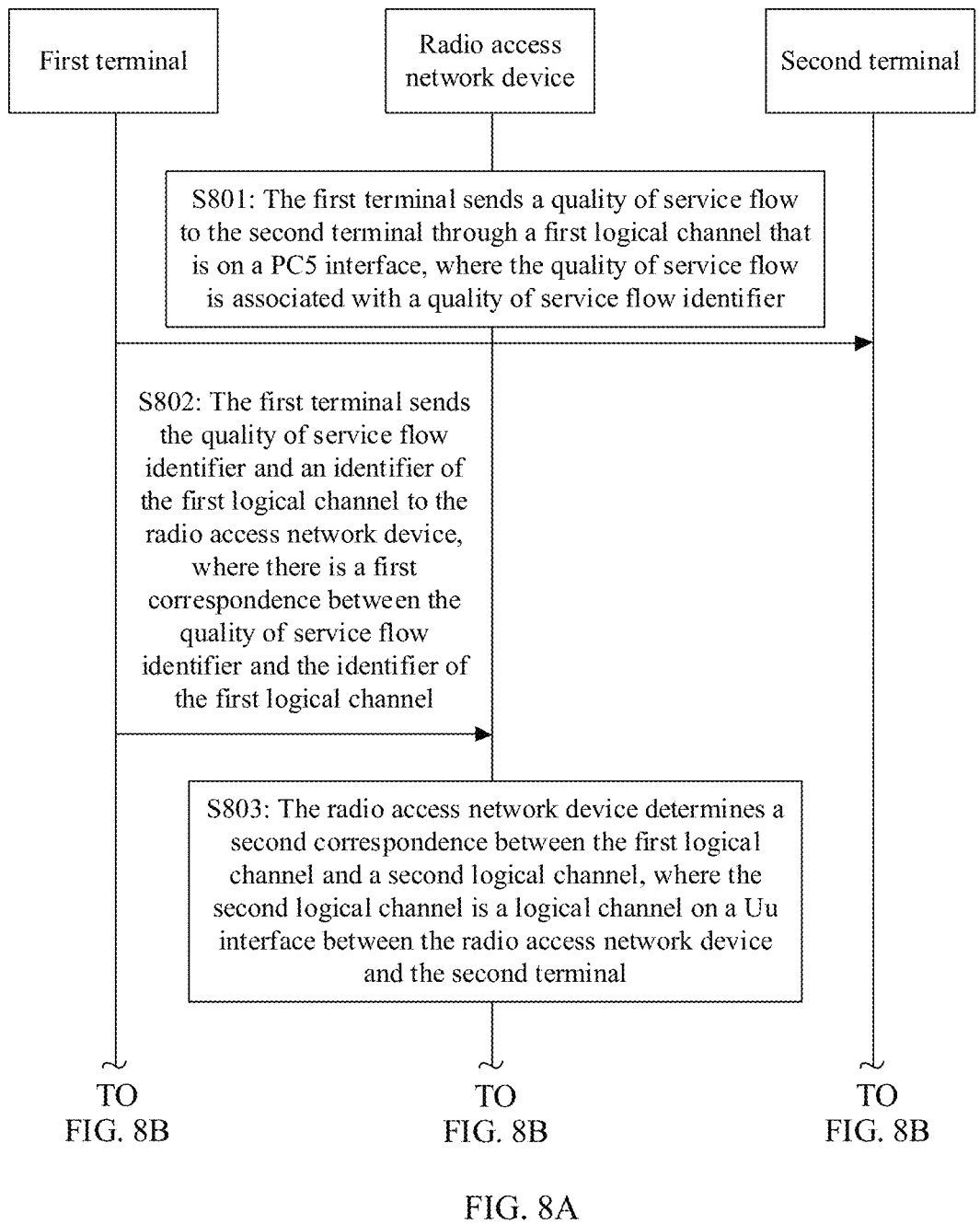
Figure 9A:
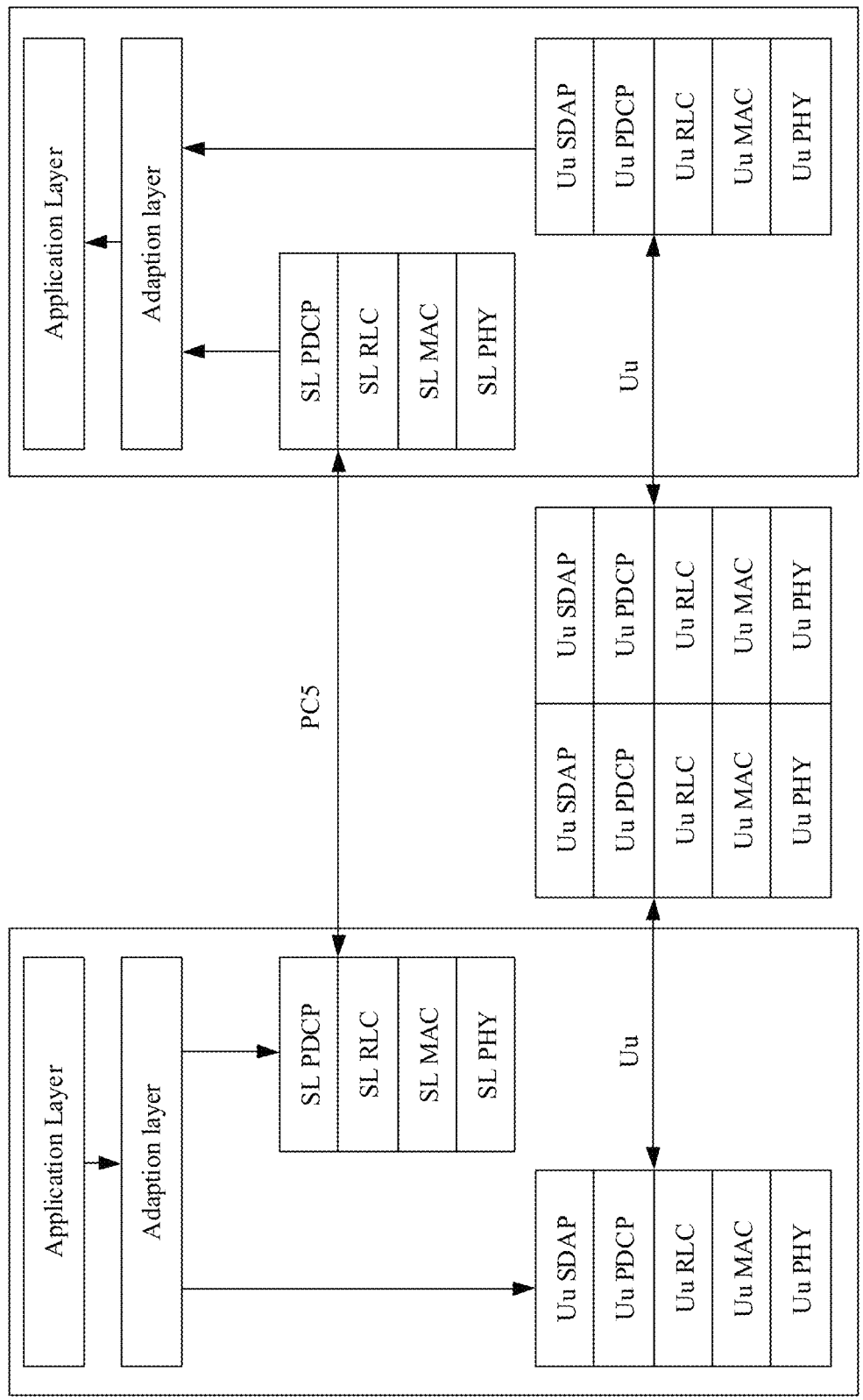
FIG. 9A is a schematic diagram of user plane protocol stacks of a Uu interface and a PC5 interface according to an embodiment of this application.

FIG. 8A and FIG. 8B are an interaction flowchart of a data transmission method according to an embodiment of this application. Network elements involved in the method include a first terminal, a second terminal, and a radio access network device. The first terminal and the second terminal both have a user plane protocol stack of a Uu interface and a user plane protocol stack of a PC5 interface, FIG. 9A is a schematic diagram of user plane protocol stacks of a Uu interface and a PC5 interface according to an embodiment of this application. As shown in FIG. 9A, the second terminal has both a user plane protocol stack of a Uu interface and a user plane protocol stack of a PC5 interface. The user plane protocol stack of the Uu interface includes: a first PHY layer (also referred to as Uu PHY), a first MAC layer (also referred to as Uu MAC), a first RLC layer (also referred to as Uu RLC), a first PDCP layer (also referred to as Uu PDCP), a first SDAP layer (also referred to as Uu SDAP), and a newly introduced adaptation layer and application layer from bottom to top, and the user plane protocol stack of the PC5 interface includes: a second PHY layer (also referred to as PC5 PHY), a second MAC layer (also referred to as PC5 MAC), a second RLC layer (also referred to as PC5 RLC), a second PDCP layer (also referred to as PC5 PDCP), the adaptation layer, and the application layer from bottom to top. As shown in FIG. 9A, one adaptation layer is newly introduced to a V2X application layer and an AS layer. The adaptation layer may also be referred to as an aggregation layer. This is not limited in this embodiment of this application. The adaptation layer is used to shield different interfaces of the AS layer (or shield technologies of AS layers of different interfaces). In other words, no matter which interface is selected, the same adaptation layer is used, to ensure continuity of the quality of service flows that exist before and after being switched between different interfaces. A difference between the protocol stacks shown in FIG. 9A and the protocol stacks shown in FIG. 7 lies in: The protocol stack of the PC5 interface shown in FIG. 9A does not have the SDAP layer.

Figure 9B:
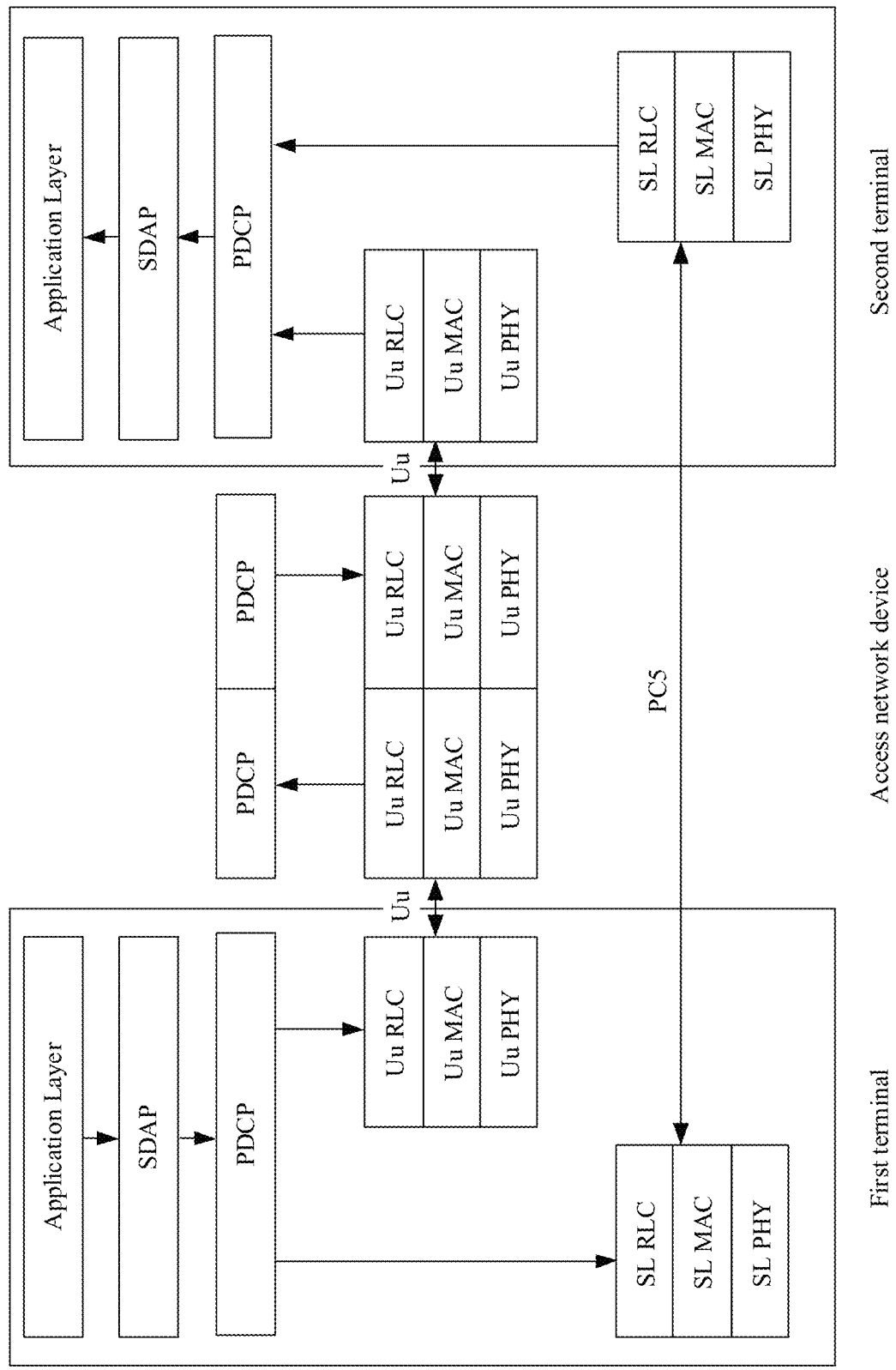
FIG. 9B is a schematic diagram of user plane protocol stacks of a Uu interface and a PC5 interface according to another embodiment of this application.

FIG. 9B is a schematic diagram of user plane protocol stacks of a Uu interface and a PC5 interface according to another embodiment of this application. As shown in FIG. 9B, the second terminal has both a user plane protocol stack of a Uu interface and a user plane protocol stack of a PC5 interface. The user plane protocol stack of the Uu interface includes: a first PHY layer (also referred to as Uu PHY), a first MAC layer (also referred to as Uu MAC), a first RLC layer (also referred to as Uu RLC), a PDCP layer (also referred to as Uu PDCP layer), a SDAP layer, and an application layer from bottom to top, and the user plane protocol stack of the PC5 interface includes: a second PHY layer (also referred to as PC5 PHY), a second MAC layer (also referred to as PC5 MAC), a second RLC layer (also referred to as PC5 RLC), and the PDCP layer (also referred to as PC5 PDCP), the service data adaptation protocol SDAP layer, and the application layer from bottom to top.

A difference between the protocol stacks shown in FIG. 9A and FIG. 9B lies in: Based on the protocol stacks shown in FIG. 9A, no matter which interface to which terminal data is sent, an anchor of the terminal data is at the adaptation layer, namely, different interfaces share the adaptation layer, and based on the protocol stacks shown in FIG. 9B, no matter which interface to which terminal data is sent, an anchor of the terminal data is at the PDCP layer, namely, different interfaces share the PDCP layer. Based on the protocol stacks shown in FIG. 9B, 1. Different interfaces use a unified SDAP entity, and are configured as SDAP without SDAP header (the SDAP layer does not need to add a header to a data packet received from an upper-layer protocol stack). In other words, only processing of mapping a quality of service flow to a DRB is performed at the SDAP layer, and the SDAP layer does not need to carry information such as a quality of service flow identifier QFI. 2. Different interfaces use a unified PDCP entity to ensure service continuity. For the Uu interface, the PDCP entity uses a network-side configuration and provides security protection. For the PC5 interface, the PDCP entity reserves a sequence number (Sequence Number, SN) function and a header compression function, and disables a security function. In other words, for the first terminal, same quality of service flows on the Uu interface and the PC5 interface use one PDCP entity, but may have different PDCP configurations. The first terminal needs to start configuration of the PDCP entity based on the selected interface.

Based on the protocol stacks shown in FIG. 9A or FIG. 9B, as shown in FIG. 8A and FIG. 8B, the data transmission method includes the following steps:

Step S801: The first terminal sends a quality of service flow to the second terminal through a first logical channel on a PC5 interface, where the quality of service flow is associated with a quality of service flow identifier.

Step S802: The first terminal sends the quality of service flow identifier and an identifier of the first logical channel to the radio access network device, where there is a first correspondence between the quality of service flow identifier and the identifier of the first logical channel.

Step S803: The radio access network device determines a second correspondence between the first logical channel and a second logical channel. The second logical channel is a logical channel on the Uu interface between the radio access network device and the second terminal.

Step S804: The radio access network device sends the identifier of the first logical channel and an identifier of the second logical channel to the second terminal, where there is a second correspondence between the identifier of the first logical channel and the identifier of the second logical channel.

Step S805: The radio access network device maps a quality of service flow received from the first terminal to the second logical channel, and sends the quality of service flow to the second terminal.

Step S806: The second terminal determines, based on the second correspondence, that the quality of service flow sent by the radio access network device through the second logical channel and the quality of service flow sent by the first terminal through the first logical channel belong to a same quality of service flow, and sends the quality of service flows to a same protocol layer for processing.

For example, the quality of service flow identifier may be a QFI.

In this embodiment, a sequence of steps S804 and S805 is not limited. S804 may be performed before S805, or S804 may be performed after S805.

Specifically, in this embodiment of this application, the quality of service flow on the first terminal is switched from the PC5 interface to the Uu interface.

Optionally, before the first terminal performs interface switching, the first terminal may separately measure the Uu interface and the PC5 interface. If the first terminal determines that an interface switching condition is met, for example, link quality of an interface for current data transmission deteriorates, and link quality of another interface is better, the first terminal sends an interface switching request message to the radio access network device, where the interface switching request message includes at least one of the following: a QFI of the quality of service flow, a packet data unit session identifier (PDU session ID), and a switching type (for example, switching from the Uu interface to the PC5 interface, or switching from the PC5 interface to the Uu interface). After receiving the interface switching request message, the radio access network device sends a switching command to the first terminal, to indicate the first terminal to switch from an original interface link to a target interface link to continue data transmission.

Optionally, the second terminal may receive the identifier of the first logical channel and the identifier of the second logical channel from the radio access network device by using an RRC message of the Uu interface, or the radio access network device sends the identifier of the first logical channel and the identifier of the second logical channel to the first terminal, and the first terminal sends signaling of the PC5 interface (which may be RRC signaling of the PC5 interface or existing signaling of the PC5 interface) to the second terminal.

Optionally, based on the protocol stacks shown in FIG. 9A, if the second terminal determines, based on the second correspondence, that the quality of service flow sent by the radio access network device through the second logical channel and the quality of service flow sent by the first terminal through the first logical channel belong to a same quality of service flow, the second terminal sends the quality of service flows the same adaptation layer for processing.

Optionally, based on the protocol stacks shown in FIG. 9B, if the second terminal determines, based on the second correspondence, that the quality of service flow sent by the radio access network device through the second logical channel and the quality of service flow sent by the first terminal through the first logical channel belong to a same quality of service flow, the second terminal sends the quality of service flows to the same PDCP layer for processing.

Optionally, the processing on the quality of service flows includes: performing reordering processing, performing repeated packet detection processing, or the like on the quality of service flows received from different interfaces. This is not limited in this application.

This embodiment of this application provides a data transmission method. When interface switching occurs on a quality of service flow sent by the first terminal to the second terminal, the second terminal may identify, based on a second correspondence between an identifier of a first logical channel and an identifier of a second logical channel, whether a quality of service flow received from the first logical channel and a quality of service flow received from the second logical channel are a same quality of service flow, and if the quality of service flows are the same, the second terminal sends the quality of service flows to a same protocol layer for processing, to ensure continuity of the quality of service flows that exist before and after being switched between different interfaces.

Embodiment 7

Figure 10:
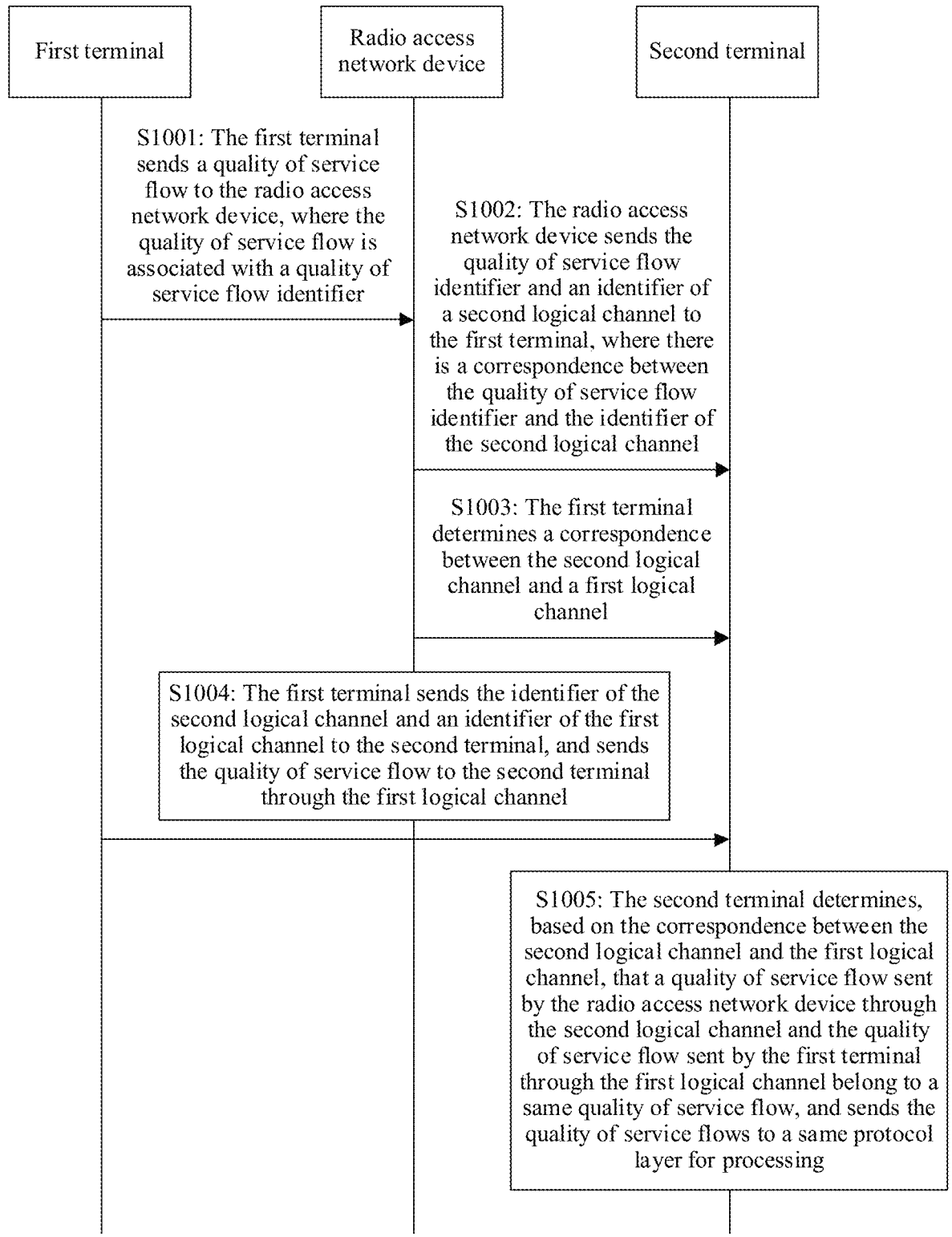
FIG. 10 is an interaction flowchart of a data transmission method according to another embodiment of this application.

FIG. 10 is an interaction flowchart of a data transmission method according to another embodiment of this application. Network elements involved in the method include a first terminal, a second terminal, and a radio access network device. The first terminal and the second terminal both have a user plane protocol stack of a Uu interface and a user plane protocol stack of a PC5 interface. As shown in FIG. 9A, the second terminal has both a user plane protocol stack of a Uu interface and a user plane protocol stack of a PC5 interface. The user plane protocol stack of the Uu interface includes: a first PHY layer (also referred to as Uu PHY), a first MAC layer (also referred to as Uu MAC), a first RLC layer (also referred to as Uu RLC), and a first PDCP layer (also referred to as Uu PDCP), a first SDAP layer (also referred to as Uu SDAP), and a newly introduced adaptation layer and application layer from bottom to top; and the user plane protocol stack of the PC5 interface includes: a second PHY layer (also referred to as PC5 PHY), a second MAC layer (also referred to as PC5 MAC), a second RLC layer (also referred to as PC5 RLC), a second PDCP layer (also referred to as PC5 PDCP), the adaptation layer, and the application layer from bottom to top. As shown in FIG. 9A, an adaptation layer is newly introduced to a V2X application layer and an AS layer. The adaptation layer may also be referred to as an aggregation layer. This is not limited in this embodiment of this application. The adaptation layer is used to shield different interfaces of the AS layer (or shield technologies of AS layers of different interfaces). In other words, no matter which interface is selected, the same adaptation layer is used, to ensure continuity of the quality of service flows that exist before and after being switched between different interfaces. A difference between the protocol stacks shown in FIG. 9A and the protocol stacks shown in FIG. 7 lies in: The PC5 interface protocol stack shown in FIG. 9A does not have the SDAP layer.

As shown in FIG. 9B, the second terminal is applicable to both the user plane protocol stack of the Uu interface and the user plane protocol stack of the PC5 interface. The user plane protocol stack of the Uu interface includes: a first PHY layer (also referred to as Uu PHY), a first MAC layer (also referred to as Uu MAC), a first RLC layer (also referred to as Uu RLC), a PDCP layer (also referred to as Uu PDCP), a SDAP layer, and an application layer from bottom to top; and the user plane protocol stack of the PC5 interface includes: a second PHY layer (also referred to as PC5 PHY), a second MAC layer (also referred to as PC5 MAC), a second RLC layer (also referred to as PC5 RLC), the PDCP layer (also referred to as PC5 PDCP), the service data adaptation protocol SDAP layer, and the application layer from bottom to top.

As described above, a difference between the protocol stacks shown in FIG. 9A and FIG. 9B lies in: Based on the protocol stacks shown in FIG. 9A, no matter which interface to which terminal data is sent, an anchor of the terminal data is at the adaptation layer, namely, different interfaces share the adaptation layer, and based on the protocol stacks shown in FIG. 9B, no matter which interface to which data is sent, an anchor of the terminal data is at the PDCP layer, namely, different interfaces share the PDCP layer. Based on the protocol stacks shown in FIG. 9B, 1. Different interfaces use a unified SDAP entity, and are configured as SDAP without SDAP header (the SDAP layer does not need to add a header to a data packet received from an upper-layer protocol stack). In other words, only processing of mapping a quality of service flow to a DRB is performed at the SDAP layer, and the SDAP layer does not need to carry information such as a quality of service flow identifier QFI. 2. Different interfaces use a unified PDCP entity to ensure service continuity. For the Uu interface, the PDCP entity uses a network-side configuration and provides security protection. For the PC5 interface, the PDCP entity reserves a sequence number (SN) function and a header compression function, and disables a security function. In other words, for the first terminal, same quality of service flows on the Uu interface and the PC5 interface use one PDCP entity, but have different PDCP configurations. The first terminal needs to start configuration of the PDCP entity based on the selected interface.

Based on the protocol stacks shown in FIG. 9A or FIG. 9B, as shown in FIG. 10, the data transmission method includes the following steps:

Step S1001: The first terminal sends a quality of service flow to the radio access network device, where the quality of service flow is associated with a quality of service flow identifier.

Step S1002: The radio access network device sends the quality of service flow identifier and an identifier of a second logical channel to the first terminal, where there is a correspondence between the quality of service flow identifier and the identifier of the second logical channel. The second logical channel is a logical channel used by the radio access network device to send the quality of service flow associated with the quality of service flow identifier to the second terminal.

Step S1003: The first terminal determines a correspondence between the second logical channel and a first logical channel, where the first logical channel is a logical channel used by the first terminal to send the quality of service flow associated with the quality of service flow identifier to the second terminal through the PC5 interface.

Step S1004: The first terminal sends the identifier of the second logical channel and an identifier of the first logical channel to the second terminal, and sends a quality of service flow to the second terminal through the first logical channel.

Step S1005: The second terminal determines, based on the correspondence between the second logical channel and the first logical channel, that the quality of service flow sent by the radio access network device through the second logical channel and the quality of service flow sent by the first terminal through the first logical channel belong to a same quality of service flow, and sends the quality of service flows to a same protocol layer for processing.

For example, the quality of service flow identifier may be a QFI.

Specifically, in this embodiment of this application, the quality of service flow on the first terminal is switched from the Uu interface to the PC5 interface.

Optionally, before the first terminal performs interface switching, the first terminal may separately measure the Uu interface and the PC5 interface. If the first terminal determines that an interface switching condition is met, for example, link quality of an interface for current data transmission deteriorates, and link quality of another interface is better, the first terminal sends an interface switching request message to the radio access network device, where the interface switching request message includes at least one of the following: a QFI of the quality of service flow, a packet data unit session identifier (PDU session ID), and a switching type (for example, switching from the Uu interface to the PC5 interface, or switching from the PC5 interface to the Uu interface). After receiving the interface switching request message, the radio access network device sends a switching command to the first terminal, to indicate the first terminal to switch from an original interface link to a target interface link to continue data transmission.

Optionally, the second terminal may receive the second correspondence by using signaling of the PC5 interface (which may be RRC signaling of the PC5 interface or existing signaling of the PC5 interface).

Optionally, based on the protocol stacks shown in FIG. 9A, if the second terminal determines, based on a correspondence between the identifier of the second logical channel and the identifier of the first logical channel, that the quality of service flow sent by the radio access network device through the second logical channel and the quality of service flow sent by the first terminal through the first logical channel belong to a same quality of service flow, the second terminal sends the quality of service flows to the same adaptation layer for processing.

Optionally, based on the protocol stacks shown in FIG. 9B, if the second terminal determines, based on a correspondence between the identifier of the second logical channel and the identifier of the first logical channel, that the quality of service flow sent by the radio access network device through the second logical channel and the quality of service flow sent by the first terminal through the first logical channel belong to a same quality of service flow, the second terminal sends the quality of service flows to the same PDCP layer for processing.

Optionally, the processing on the quality of service flows includes: performing reordering processing, performing repeated packet detection processing, or the like on the quality of service flows received from different interfaces. This is not limited in this application.

This embodiment of this application provides a data transmission method. When interface switching occurs on a quality of service flow sent by the first terminal to the second terminal, the second terminal may identify, based on a correspondence between a first logical channel and a second logical channel, whether a quality of service flow received from the first logical channel and a quality of service flow received from the second logical channel are a same quality of service flow, and if the quality of service flows are the same, the second terminal sends the quality of service flows to a same protocol layer for processing, to ensure continuity of the quality of service flows that exist before and after being switched between different interfaces.

Embodiment 8

Figure 11:
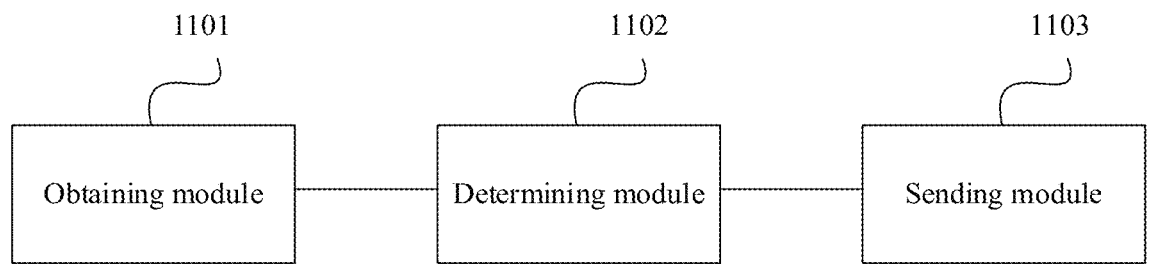
FIG. 11 is a schematic diagram of a terminal according to an embodiment of this application.

FIG. 11 is a schematic diagram of a terminal according to an embodiment of this application. As shown in FIG. 11, the terminal is a first terminal, and includes an obtaining module 1101, a determining module 1102, and a sending module 1103.

The obtaining module 1101 is configured to obtain a quality of service flow identifier and a QoS parameter of a quality of service flow, where there is a correspondence between the quality of service flow identifier and the QoS parameter of the quality of service flow. The determining module 1102 is configured to determine a logical channel used by the quality of service flow of the first terminal on a wireless direct communications interface, where the wireless direct communications interface is a communications interface between the first terminal and a second terminal. The sending module 1103 is configured to: map the quality of service flow to the logical channel, and send the quality of service flow to the second terminal.

The determining module 1102 is specifically configured to determine, based on the correspondence, the logical channel used by the quality of service flow of the first terminal on the wireless direct communications interface.

Optionally, that there is a correspondence between the quality of service flow identifier and the QoS parameter of the quality of service flow includes: a correspondence between the quality of service flow identifier and a 5QI of the quality of service flow, or a correspondence between the quality of service flow identifier and at least one quality parameter of a priority, a packet delay budget PDB, and a packet error rate PER of the quality of service flow.

Optionally, the quality of service flow identifier and the QoS parameter of the quality of service flow are carried in an RRC message or an NAS message.

Optionally, the obtaining module 1101 is further configured to: obtain the quality of service flow identifier and at least one quality parameter of a GBR and a MBR of the quality of service flow, where there is a correspondence between the quality of service flow identifier and the at least one quality parameter; or obtain the 5QI of the quality of service flow and at least one quality parameter of a GBR and a MBR of the quality of service flow, where there is a correspondence between the 5QI of the quality of service flow and the at least one quality parameter; and/or obtain an aggregate maximum bit rate AMBR of all non-guaranteed bit rate Non-GBR services sent by the first terminal to the second terminal.

Optionally, before the sending module 1103 maps the quality of service flow to the logical channel, and sends the quality of service flow to the second terminal, the determining module 1102 is further configured to: determine a priority of the logical channel based on the priority of the quality of service flow; or obtain a priority of the logical channel from a radio access network device.

Optionally, the obtaining module 1101 is further configured to: obtain the quality of service flow identifier and an identifier of a LCG on the wireless direct communications interface, where there is a correspondence between the quality of service flow identifier and the identifier of the LCG, and the correspondence between the quality of service flow identifier and the identifier of the LCG is used by the first terminal to send a buffer status report BSR to an access side device; or obtain the identifier of the logical channel on the wireless direct communications interface and an identifier of a LCG, where there is a correspondence between the identifier of the logical channel and the identifier of the LCG, and the correspondence between the identifier of the logical channel and the identifier of the LCG is used by the first terminal to send a buffer status report BSR to an access side device; or obtain the 5QI of the quality of service flow and an identifier of a LCG on the wireless direct communications interface, where there is a correspondence between the 5QI and the identifier of the LCG, and the correspondence between the 5QI and the identifier of the LCG is used by the first terminal to send a buffer status report BSR to an access side device.

Optionally, when the first terminal communicates with both the radio access network device and the second terminal, before the sending module 1103 maps the quality of service flow to the logical channel, and sends the quality of service flow to the second terminal, the obtaining module 1101 is further configured to obtain a preset value.

Correspondingly, the sending module 1103 is specifically configured to: if at least one of the QFI, the priority of the quality of service flow, and the 5QI of the quality of service flow is less than or equal to the preset value, preferentially send the quality of service flow to the second terminal through the logical channel.

Optionally, before mapping the quality of service flow to the logical channel, and sending the quality of service flow to the second terminal, the sending module 1103 is further configured to: send SCI on the wireless direct communications interface to the second terminal, where the SCI includes at least one of the following parameters: the quality of service flow identifier and the 5QI of the quality of service flow, to enable the second terminal to sense a service situation on the wireless direct communications interface.

Optionally, the sending module 1103 is further configured to send, to the radio access network device, at least one of the following to: the quality of service flow identifier and the 5QI of the quality of service flow, to enable the radio access network device to determine whether semi-persistent scheduling needs to be performed on the first terminal.

The terminal provided in this embodiment of this application may be configured to perform an operation performed by the first terminal in Embodiment 1. For content and effects of the terminal, refer to Embodiment 1. Details are not described herein again.

Embodiment 9

Figure 12:
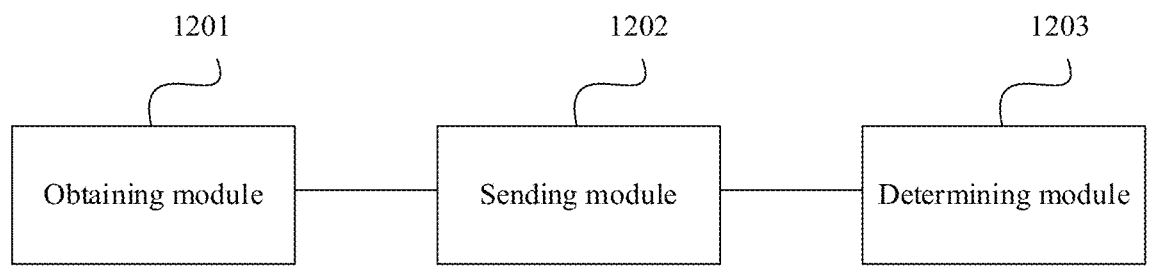
FIG. 12 is a schematic diagram of a terminal according to another embodiment of this application.

FIG. 12 is a schematic diagram of a terminal according to another embodiment of this application. As shown in FIG. 12, the terminal is a first terminal, and includes an obtaining module 1201 and a sending module 1202.

The obtaining module 1201 is configured to receive a quality of service flow identifier and an identifier of a logical channel on a wireless direct communications interface that are sent by a radio access network device, where there is a correspondence between the quality of service flow identifier and the identifier of the logical channel on the wireless direct communications interface, and the wireless direct communications interface is a communications interface between the first terminal and a second terminal.

The sending module 1202 is configured to: map the quality of service flow to the logical channel based on the correspondence, and send the quality of service flow to the second terminal.

Optionally, the obtaining module 1201 is further configured to: obtain the quality of service flow identifier and at least one quality parameter of a GBR and a MBR of the quality of service flow, where there is a correspondence between the quality of service flow identifier and the at least one quality parameter; or obtain the 5QI of the quality of service flow and at least one quality parameter of a GBR and a MBR of the quality of service flow, where there is a correspondence between the 5QI of the quality of service flow and the at least one quality parameter; and/or obtain an AMBR of all non-guaranteed bit rate Non-GBR services sent by the first terminal to the second terminal.

Optionally, the terminal further includes a determining module 1203. Before the sending module 1202 maps the quality of service flow to the logical channel, and sends the quality of service flow to the second terminal, the determining module 1203 is further configured to: determine a priority of the logical channel based on the priority of the quality of service flow; or obtain a priority of the logical channel from the radio access network device.

Optionally, the obtaining module 1201 is further configured to: obtain the quality of service flow identifier and an identifier of a LCG on the wireless direct communications interface, where there is a correspondence between the quality of service flow identifier and the identifier of the LCG, and the correspondence between the quality of service flow identifier and the identifier of the LCG is used by the first terminal to send a buffer status report BSR to an access side device; or obtain the identifier of the logical channel on the wireless direct communications interface and an identifier of a LCG, where there is a correspondence between the identifier of the logical channel and the identifier of the LCG, and the correspondence between the identifier of the logical channel and the identifier of the LCG is used by the first terminal to send a buffer status report BSR to an access side device; or obtain the 5G quality identifier 5QI of the quality of service flow and an identifier of a logical channel group LCG on the wireless direct communications interface, where there is a correspondence between the 5QI and the identifier of the LCG, and the correspondence between the 5QI and the identifier of the LCG is used by the first terminal to send a buffer status report BSR to an access side device.

Optionally, when the first terminal communicates with both the radio access network device and the second terminal, before the sending module 1202 maps the quality of service flow to the logical channel, and sends the quality of service flow to the second terminal, the obtaining module 1201 is further configured to obtain a preset value.

Correspondingly, the sending module 1202 is specifically configured to: if at least one of the quality of service flow identifier QFI, the priority of the quality of service flow, and the 5G quality identifier 5QI of the quality of service flow is less than or equal to the preset value, preferentially send the quality of service flow to the second terminal through the logical channel.

Optionally, before mapping the quality of service flow to the logical channel, and sending the quality of service flow to the second terminal, the sending module 1202 is further configured to: send sidelink control information SCI on the wireless direct communications interface to the second terminal, where the SCI includes at least one of the following parameters: the quality of service flow identifier QFI and the 5G quality identifier 5QI of the quality of service flow, to enable the second terminal to sense a service situation on the wireless direct communications interface.

Optionally, the sending module 1202 is further configured to send, to the radio access network device, at least one of the following: the quality of service flow identifier and the 5G quality identifier 5QI of the quality of service flow, to enable the radio access network device to determine whether semi-persistent scheduling needs to be performed on the first terminal.

The terminal provided in this embodiment of this application may be configured to perform an operation performed by the first terminal in Embodiment 2. For content and effects of the terminal, refer to Embodiment 2. Details are not described herein again.

Embodiment 10

Figure 13:
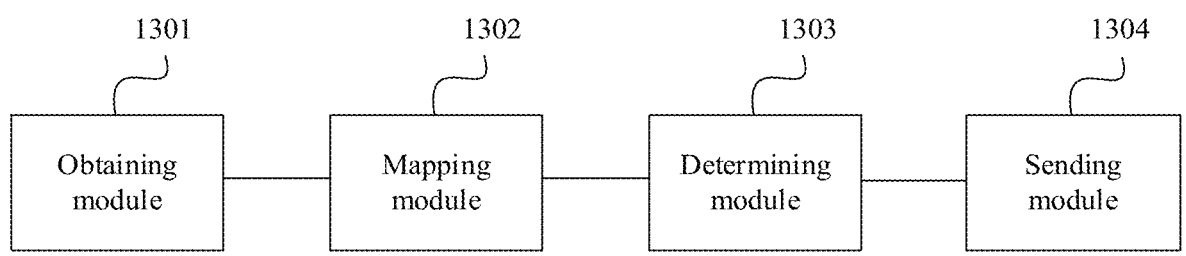
FIG. 13 is a schematic diagram of a terminal according to still another embodiment of this application.

FIG. 13 is a schematic diagram of a terminal according to still another embodiment of this application. As shown in FIG. 13, the terminal is a first terminal, and includes an obtaining module 1301, a mapping module 1302, a determining module 1303, and a sending module 1304.

The obtaining module 1301 is configured to obtain a prose per-packet priority PPPP and/or prose per-packet reliability PPPR and a QoS parameter of a quality of service flow of the first terminal, where there is a correspondence between the PPPP and/or the PPPR and the QoS parameter.

The mapping module 1302 is configured to map, based on the correspondence, a data packet associated with the PPPP and/or the PPPR to the quality of service flow associated with the QoS parameter.

The determining module 1303 is configured to determine a logical channel used by the quality of service flow on a wireless direct communications interface.

The sending module 1304 is configured to: map the quality of service flow to the logical channel, and send the quality of service flow to a second terminal.

Optionally, the correspondence between the PPPP and/or the PPPR and the QoS parameter of the quality of service flow of the first terminal includes: a correspondence between the PPPP and/or the PPPR and a 5QI of the quality of service flow, or a correspondence between the PPPP and/or the PPPR and at least one quality parameter of a priority, a PDB, and a PER of the quality of service flow.

Optionally, the correspondence is obtained after a V2X control functional entity in a near-end communications system negotiates with a PCF entity in a 3GPP system.

Optionally, the first terminal obtains the correspondence by using a data radio bearer DRB; or the first terminal obtains the correspondence by using an RRC message; or the first terminal obtains the correspondence by using an NAS message.

Optionally, the obtaining module 1301 is further configured to: obtain the quality of service flow identifier and at least one quality parameter of a GBR and a MBR of the quality of service flow, where there is a correspondence between the quality of service flow identifier and the at least one quality parameter; or obtain the 5QI of the quality of service flow and at least one quality parameter of a GBR and a MBR of the quality of service flow, where there is a correspondence between the 5QI of the quality of service flow and the at least one quality parameter; and/or obtain an aggregate maximum bit rate AMBR of all non-guaranteed bit rate Non-GBR services sent by the first terminal to the second terminal.

Optionally, before the sending module 1304 maps the quality of service flow to the logical channel, and sends the quality of service flow to the second terminal, the determining module 1303 is further configured to: determine a priority of the logical channel based on the priority of the quality of service flow; or obtain a priority of the logical channel from a radio access network device.

Optionally, the obtaining module 1301 is further configured to: obtain the quality of service flow identifier and an identifier of a LCG on the wireless direct communications interface, where there is a correspondence between the quality of service flow identifier and the identifier of the LCG, and the correspondence between the quality of service flow identifier and the identifier of the LCG is used by the first terminal to send a buffer status report BSR to an access side device; or obtain the identifier of the logical channel on the wireless direct communications interface and an identifier of a LCG, where there is a correspondence between the identifier of the logical channel and the identifier of the LCG, and the correspondence between the identifier of the logical channel and the identifier of the LCG is used by the first terminal to send a BSR to an access side device; or obtain the 5QI of the quality of service flow and an identifier of a LCG on the wireless direct communications interface, where there is a correspondence between the 5QI and the identifier of the LCG, and the correspondence between the 5QI and the identifier of the LCG is used by the first terminal to send a BSR to an access side device.

Optionally, when the first terminal communicates with both the radio access network device and the second terminal, before the sending module 1304 maps the quality of service flow to the logical channel, and sends the quality of service flow to the second terminal, the obtaining module 1301 is further configured to obtain a preset value.

Correspondingly, the sending module 1304 is specifically configured to: if at least one of the QFI, the priority of the quality of service flow, and the 5QI of the quality of service flow is less than or equal to the preset value, preferentially send the quality of service flow to the second terminal through the logical channel.

Optionally, before mapping the quality of service flow to the logical channel, and sending the quality of service flow to the second terminal, the sending module 1304 is further configured to: send SCI on the wireless direct communications interface to the second terminal, where the SCI includes at least one of the following parameters: the quality of service flow identifier and the 5QI of the quality of service flow, to enable the second terminal to sense a service situation on the wireless direct communications interface.

Optionally, the sending module 1304 is further configured to send, to the radio access network device, at least one of the following: the quality of service flow identifier and the 5QI of the quality of service flow, to enable the radio access network device to determine whether semi-persistent scheduling needs to be performed on the first terminal.

The terminal provided in this embodiment of this application may be configured to perform an operation performed by the first terminal in Embodiment 3. For content and effects of the terminal, refer to Embodiment 3. Details are not described herein again.

Embodiment 11

Figure 14:
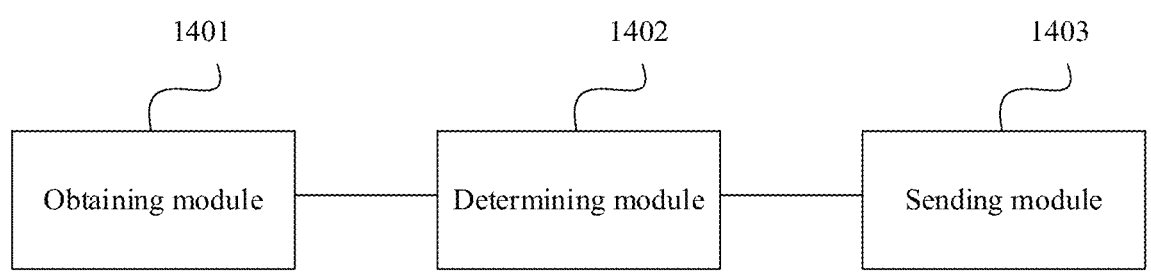
FIG. 14 is a schematic diagram of a terminal according to yet another embodiment of this application.

FIG. 14 is a schematic diagram of a terminal according to yet another embodiment of this application. As shown in FIG. 14, the terminal is a first terminal, and includes an obtaining module 1401, a determining module 1402, and a sending module 1403.

The obtaining module 1401 is configured to obtain a quality of service flow of the first terminal, where the quality of service flow is associated with a QoS parameter. The determining module 1402 is configured to determine a logical channel used by the quality of service flow on a wireless direct communications interface. The sending module 1403 is configured to: map the quality of service flow to the logical channel, and send the quality of service flow to a second terminal.

Optionally, that the quality of service flow is associated with a QoS parameter includes: the quality of service flow is associated with a 5QI of the quality of service flow; or the quality of service flow is associated with at least one quality parameter of a priority, a PDB, and a PER of the quality of service flow.

Optionally, that there is a correspondence between a quality of service flow identifier and the QoS parameter of the quality of service flow includes: a correspondence between the quality of service flow identifier and a 5QI of the quality of service flow, or a correspondence between the quality of service flow identifier and at least one quality parameter of a priority, a PDB, and a PER of the quality of service flow.

Optionally, the quality of service flow identifier and the QoS parameter of the quality of service flow are carried in an RRC message or an NAS message.

Optionally, the obtaining module 1401 is further configured to: obtain the quality of service flow identifier and at least one quality parameter of a GBR and a MBR of the quality of service flow, where there is a correspondence between the quality of service flow identifier and the at least one quality parameter; or obtain the 5QI of the quality of service flow and at least one quality parameter of a GBR and a MBR of the quality of service flow, where there is a correspondence between the 5QI of the quality of service flow and the at least one quality parameter; and/or obtain an AMBR of all non-guaranteed bit rate Non-GBR services sent by the first terminal to the second terminal.

Optionally, before the sending module 1403 maps the quality of service flow to the logical channel, and sends the quality of service flow to the second terminal, the determining module 1402 is further configured to: determine a priority of the logical channel based on the priority of the quality of service flow; or obtain a priority of the logical channel from a radio access network device.

Optionally, the obtaining module 1401 is further configured to: obtain the quality of service flow identifier and an identifier of a LCG on the wireless direct communications interface, where there is a correspondence between the quality of service flow identifier and the identifier of the LCG, and the correspondence between the quality of service flow identifier and the identifier of the LCG is used by the first terminal to send a BSR to an access side device; or obtain the identifier of the logical channel on the wireless direct communications interface and an identifier of a LCG, where there is a correspondence between the identifier of the logical channel and the identifier of the LCG, and the correspondence between the identifier of the logical channel and the identifier of the LCG is used by the first terminal to send a buffer status report BSR to an access side device; or obtain the 5QI of the quality of service flow and an identifier of a LCG on the wireless direct communications interface, where there is a correspondence between the 5QI and the identifier of the LCG, and the correspondence between the 5QI and the identifier of the LCG is used by the first terminal to send a BSR to an access side device.

Optionally, when the first terminal communicates with both the radio access network device and the second terminal, before the sending module 1403 maps the quality of service flow to the logical channel, and sends the quality of service flow to the second terminal, the obtaining module 1401 is further configured to obtain a preset value.

Correspondingly, the sending module 1403 is specifically configured to: if at least one of the QFI, the priority of the quality of service flow, and the 5QI of the quality of service flow is less than or equal to the preset value, preferentially send the quality of service flow to the second terminal through the logical channel.

Optionally, before mapping the quality of service flow to the logical channel, and sending the quality of service flow to the second terminal, the sending module 1403 is further configured to: send sidelink control information SCI on the wireless direct communications interface to the second terminal, where the SCI includes at least one of the following parameters: the quality of service flow identifier and the 5G quality identifier 5QI of the quality of service flow, to enable the second terminal to sense a service situation on the wireless direct communications interface.

Optionally, the sending module 1403 is further configured to send, to the radio access network device, at least one of the following: the quality of service flow identifier and the 5QI of the quality of service flow, to enable the radio access network device to determine whether semi-persistent scheduling needs to be performed on the first terminal.

The terminal provided in this embodiment of this application may be configured to perform an operation performed by the first terminal in Embodiment 4. For content and effects of the terminal, refer to Embodiment 4. Details are not described herein again.

Embodiment 12

Figure 15:
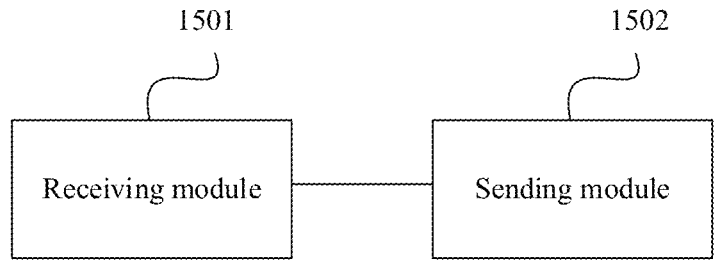
FIG. 15 is a schematic diagram of a terminal according to yet another embodiment of this application.

FIG. 15 is a schematic diagram of a terminal according to yet another embodiment of this application. As shown in FIG. 15, the terminal is a second terminal, and includes a receiving module 1501 and a sending module 1502.

The receiving module 1501 is configured to: receive a quality of service flow sent by a first terminal through a first logical channel on a wireless direct communications interface, where the quality of service flow is associated with a QFI; receive a quality of service flow sent by a radio access network device through a second logical channel on a Uu interface, where the quality of service flow includes a QFI; and if the QFI of the quality of service flow received from the first logical channel is the same as the QFI of the quality of service flow received from the second logical channel, the sending module 1502 sends the quality of service flows to a same protocol layer for processing.

Optionally, the second terminal is applicable to both a user plane protocol stack of the Uu interface and a user plane protocol stack of the wireless direct communications interface, where the user plane protocol stack of the wireless direct communications interface includes: a first PHY layer, a first MAC layer, a first RLC layer, a first PDCP layer, a first SDAP layer, an adaptation layer, and an application layer from bottom to top, and the user plane protocol stack of the Uu interface includes: a second PHY layer, a second MAC layer, a second RLC layer, a second PDCP layer, a second SDAP layer, the adaptation layer, and the application layer from bottom to top. Correspondingly, the sending module 1502 is specifically configured to send the quality of service flows received from the Uu interface and the wireless direct communications interface to the same adaptation layer for processing.

The terminal provided in this embodiment of this application may be configured to perform an operation performed by the second terminal in Embodiment 5. For content and effects of the terminal, refer to Embodiment 5. Details are not described herein again.

Embodiment 13

Figure 16:
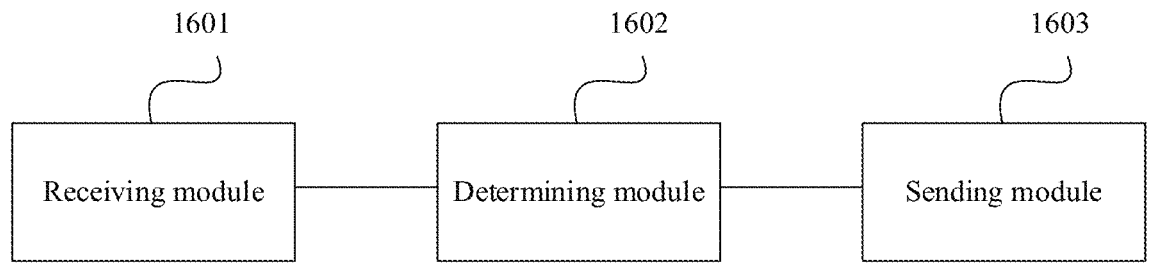
FIG. 16 is a schematic diagram of a radio access network device according to yet another embodiment of this application.

FIG. 16 is a schematic diagram of a radio access network device according to yet another embodiment of this application. As shown in FIG. 16, the radio access network device includes a receiving module 1601, a determining module 1602, and a sending module 1603.

The receiving module 1601 is configured to receive a quality of service flow identifier and an identifier of a first logical channel that are sent by a first terminal, where there is a first correspondence between the quality of service flow identifier and the identifier of the first logical channel, and the quality of service flow is a quality of service flow sent by the first terminal to a second terminal through the first logical channel on a wireless direct communications interface. The determining module 1602 is configured to determine a second correspondence between the first logical channel and a second logical channel. The sending module 1603 is configured to: map the quality of service flow received from the first terminal to the second logical channel, send the quality of service flow to the second terminal, and send the identifier of the first logical channel and an identifier of the second logical channel to the second terminal, where the second logical channel is a logical channel on a Uu interface between the radio access network device and the second terminal. Therefore, continuity of the quality of service flows that exist before and after being switched between different interfaces is ensured.

The radio access network device provided in this embodiment of this application may be configured to perform an operation performed by the radio access network device in Embodiment 6. For content and effects of the radio access network device, refer to Embodiment 6. Details are not described herein again.

Embodiment 14

Figure 17:
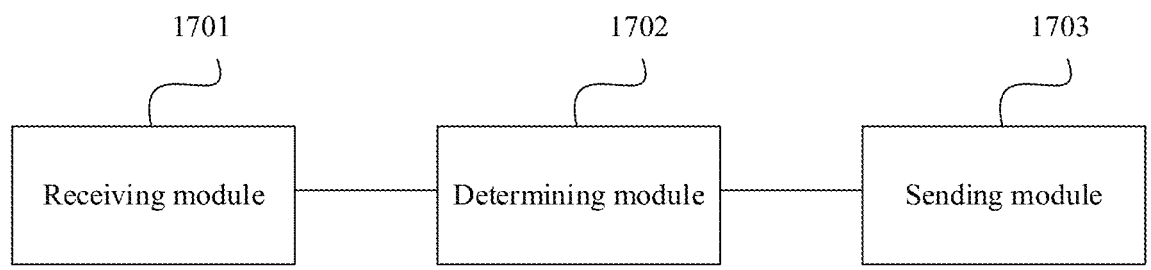
FIG. 17 is a schematic diagram of a terminal according to yet another embodiment of this application.

FIG. 17 is a schematic diagram of a terminal according to yet another embodiment of this application. As shown in FIG. 17, the terminal is a second terminal, and includes a receiving module 1701, a determining module 1702, and a sending module 1703.

The receiving module 1701 is configured to receive an identifier of a first logical channel and an identifier of a second logical channel that are sent by a radio access network device, where there is a second correspondence between the identifier of the first logical channel and the identifier of the second logical channel, the first logical channel is a logical channel on a wireless direct communications interface between a first terminal and the second terminal, and the second logical channel is a logical channel on a Uu interface between the radio access network device and the second terminal. The determining module 1702 is configured to: determine, based on the second correspondence, that a quality of service flow sent by the radio access network device through the second logical channel and a quality of service flow sent by the first terminal through the first logical channel belong to a same quality of service flow. The sending module 1703 is configured to send the quality of service flows to a same protocol layer for processing. Therefore, continuity of the quality of service flows that exist before and after being switched between different interfaces is ensured.

The terminal provided in this embodiment of this application may be configured to perform an operation performed by the second terminal in Embodiment 6. For content and effects of the terminal, refer to Embodiment 6. Details are not described herein again.

Embodiment 15

Figure 18:
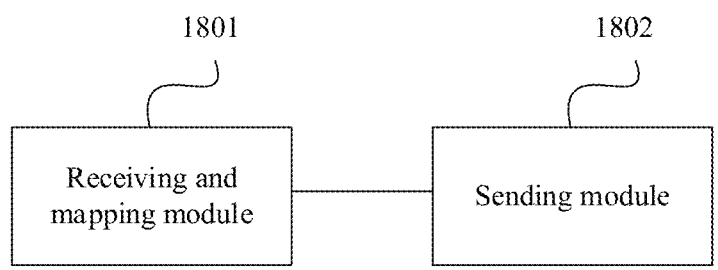
FIG. 18 is a schematic diagram of a radio access network device according to yet another embodiment of this application.

FIG. 18 is a schematic diagram of a radio access network device according to yet another embodiment of this application. As shown in FIG. 18, the radio access network device includes a receiving and mapping module 1801 and a sending module 1802.

The receiving and mapping module 1801 is configured to: receive a quality of service flow sent by a first terminal, map the quality of service flow to a second logical channel, and send the quality of service flow to a second terminal, where the second logical channel is a logical channel on a Uu interface between the radio access network device and the second terminal. The sending module 1802 is configured to: send a quality of service flow identifier and an identifier of the second logical channel to the first terminal, and send the quality of service flow to the second terminal through the second logical channel, where there is a correspondence between the quality of service flow identifier and the identifier of the second logical channel. Therefore, continuity of the quality of service flows that exist before and after being switched between different interfaces is ensured.

The radio access network device provided in this embodiment of this application may be configured to perform an operation performed by the radio access network device in Embodiment 7. For content and effects of the radio access network device, refer to Embodiment 7. Details are not described herein again.

Embodiment 16

Figure 19:
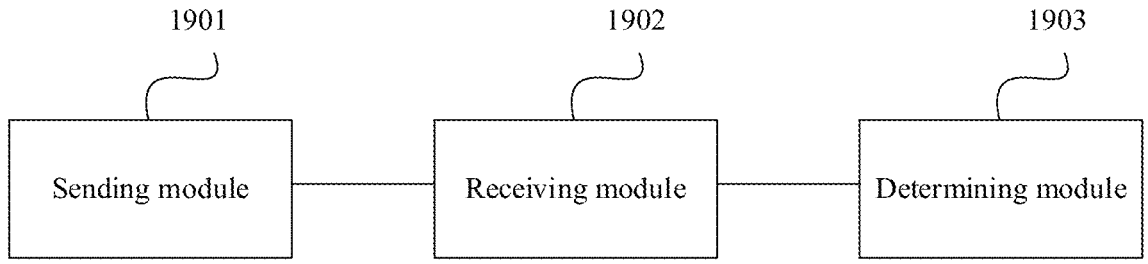
FIG. 19 is a schematic diagram of a terminal according to yet another embodiment of this application.

FIG. 19 is a schematic diagram of a terminal according to yet another embodiment of this application. As shown in FIG. 19, the terminal is a first terminal, and includes a sending module 1901, a receiving module 1902, and a determining module 1903.

The sending module 1901 is configured to send a quality of service flow to a radio access network device. The receiving module 1902 is configured to receive a quality of service flow identifier and an identifier of a second logical channel that are sent by the radio access network device, where there is a correspondence between the quality of service flow identifier and the identifier of the second logical channel, and the second logical channel is a logical channel on a Uu interface between the radio access network device and a second terminal. The determining module 1903 is configured to determine a correspondence between the second logical channel and a first logical channel. The sending module 1901 is configured to: send the identifier of the second logical channel and an identifier of the first logical channel to the second terminal, and send the quality of service flow to the second terminal through the first logical channel. Therefore, continuity of the quality of service flows that exist before and after being switched between different interfaces is ensured.

The terminal provided in this embodiment of this application may be configured to perform an operation performed by the first terminal in Embodiment 7. For content and effects of the terminal, refer to Embodiment 7. Details are not described herein again.

Embodiment 17

Figure 20:
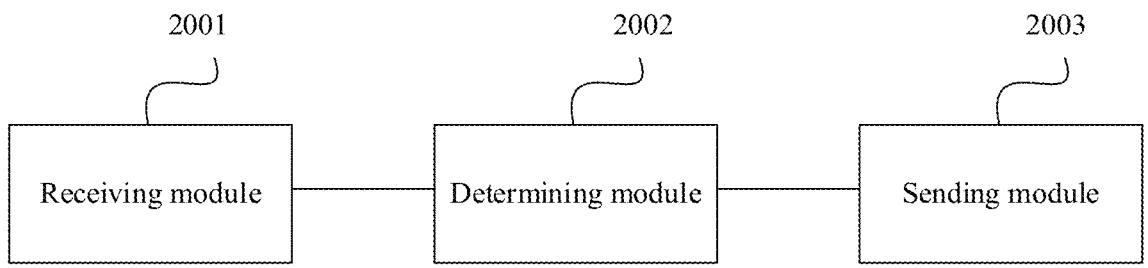
FIG. 20 is a schematic diagram of a terminal according to yet another embodiment of this application.

FIG. 20 is a schematic diagram of a terminal according to yet another embodiment of this application. As shown in FIG. 20, the terminal is a second terminal, and includes a receiving module 2001, a determining module 2002, and a sending module 2003.

The receiving module 2001 is configured to receive an identifier of a first logical channel and an identifier of a second logical channel that are sent by a first terminal, where there is a correspondence between the identifier of the first logical channel and the identifier of the second logical channel, the first logical channel is a logical channel on a wireless direct communications interface between the first terminal and the second terminal, and the second logical channel is a logical channel on a Uu interface between a radio access network device and the second terminal. The determining module 2002 is configured to determine, based on the correspondence, that a quality of service flow sent by the radio access network device through the second logical channel and a quality of service flow sent by the first terminal through the first logical channel belong to a same quality of service flow. The sending module 2003 is configured to send the service flows to a same protocol layer for processing. Therefore, continuity of the quality of service flows that exist before and after being switched between different interfaces is ensured.

Optionally, the second terminal is applicable to both a user plane protocol stack of the Uu interface and a user plane protocol stack of the wireless direct communications interface, where the user plane protocol stack of the Uu interface includes: a first PHY layer, a first MAC layer, a first RLC layer, a first PDCP layer, a first SDAP layer, an adaptation layer, and an application layer from bottom to top, and the user plane protocol stack of the wireless direct communications interface includes: a second PHY layer, a second MAC layer, a second RLC layer, a second PDCP layer, the adaptation layer, and the application layer from bottom to top. Correspondingly, the sending module 2003 is specifically configured to send the quality of service flows received from the Uu interface and the wireless direct communications interface to the same adaptation layer for processing.

Optionally, the second terminal is applicable to both a user plane protocol stack of the Uu interface and a user plane protocol stack of the wireless direct communications interface, where the user plane protocol stack of the Uu interface includes: a first PHY layer, a first MAC layer, a first RLC layer, a PDCP layer, a SDAP layer, and an application layer from bottom to top, and the user plane protocol stack of the wireless direct communications interface includes: a second PHY layer, a second MAC layer, a second RLC layer, the PDCP layer, the SDAP layer, and the application layer from bottom to top. Correspondingly, the sending module 2003 is specifically configured to send the quality of service flows received from the Uu interface and the wireless direct communications interface to the same PDCP layer for processing.

Optionally, the receiving module 2001 is specifically configured to receive the identifier of the first logical channel and the identifier of the second logical channel by using an RRC message of the wireless direct communications interface or wireless direct communications interface signaling.

The terminal provided in this embodiment of this application may be configured to perform an operation performed by the second terminal in Embodiment 7. For content and effects of the terminal, refer to Embodiment 7. Details are not described herein again.

Embodiment 18

Figure 21:
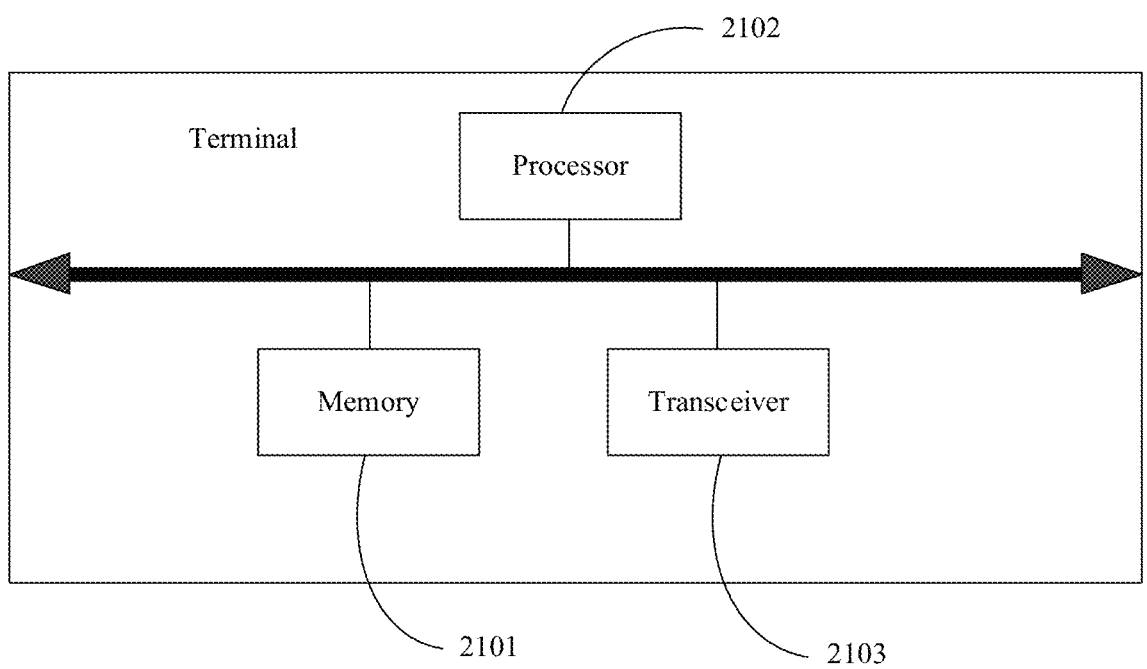
FIG. 21 is a schematic diagram of a terminal according to an embodiment of this application.

FIG. 21 is a schematic diagram of a terminal according to an embodiment of this application. As shown in FIG. 21, the terminal includes a memory 2101, a processor 2102, and a transceiver 2103. The memory 2101 is configured to store a computer program, and the computer program is run on the processor 2102, to enable the terminal to implement the foregoing data transmission method performed by the first terminal or the second terminal. The transceiver 2103 is configured to implement communication with another device.

The terminal provided in this embodiment of this application may be configured to perform the data transmission method performed by the first terminal or the second terminal. For content and effects of the terminal, refer to the method embodiment. Details are not described herein again.

Embodiment 19

Figure 22:
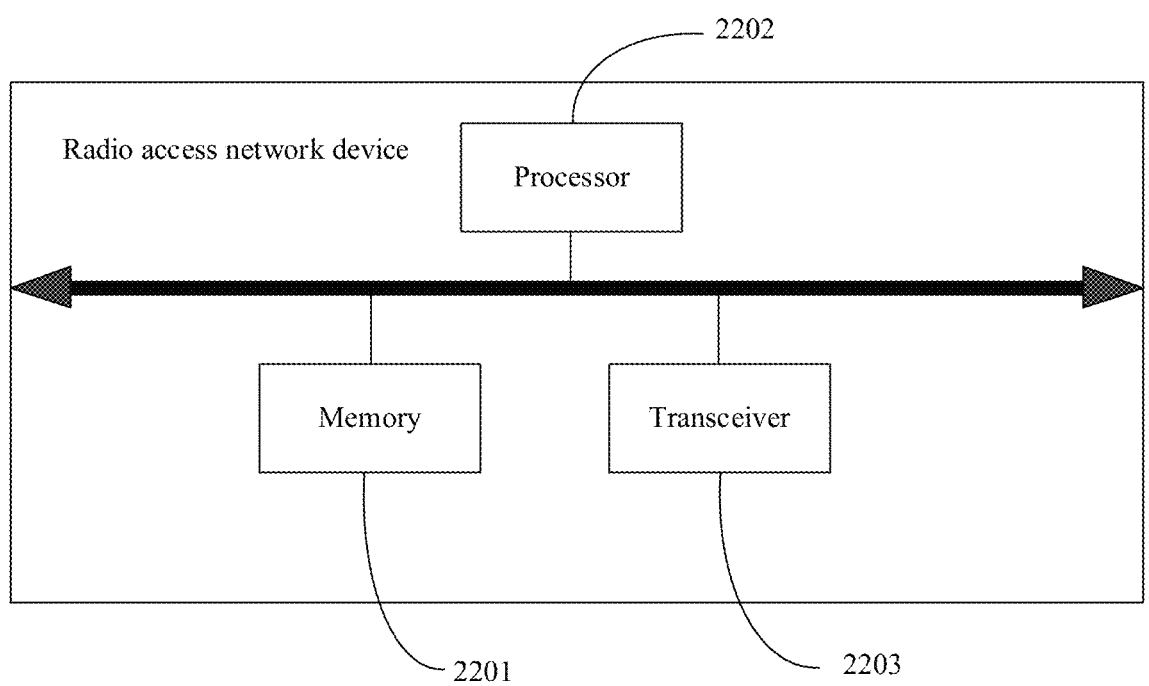
FIG. 22 is a schematic diagram of a radio access network device according to an embodiment of this application.

FIG. 22 is a schematic diagram of a radio access network device according to an embodiment of this application. As shown in FIG. 22, the radio access network device includes a memory 2201, a processor 2202, and a transceiver 2203. The memory 2201 is configured to store a computer program, and the computer program is run on the processor 2202, to enable the terminal to implement the foregoing data transmission method performed by the first terminal or the second terminal. The transceiver 2203 is configured to implement communication with another device.

The radio access network device provided in this embodiment of this application may be configured to perform the data transmission method performed by the radio access network device. For content and effects of the radio access network device, refer to the method embodiment.

Details are not described herein again.

Embodiment 20

This application provides a storage medium. The storage medium includes a computer program, and the computer program is used to implement the foregoing data transmission method. For content and effects of the computer program, refer to the method embodiment. Details are not described herein again.

Embodiment 21

This application provides a computer program product. The computer program product includes a computer program, and the computer program is used to implement the foregoing data transmission method. For content and effects of the computer program, refer to the method embodiment. Details are not described herein again.

What is claimed is:

1. A data transmission method, comprising:
obtaining, by a first terminal, a quality of service flow identifier and a QoS parameter of a quality of service flow, wherein there is a correspondence between the quality of service flow identifier and the QoS parameter;
determining, by the first terminal, a logical channel used by the quality of service flow of the first terminal on a wireless direct communications interface, wherein the wireless direct communications interface is a communications interface between the first terminal and a second terminal; and
mapping, by the first terminal, the quality of service flow to the logical channel and sending the quality of service flow to the second terminal.

2. The method according to claim 1, wherein determining, by the first terminal, the logical channel used by the quality of service flow of the first terminal on the wireless direct communications interface is based on the correspondence.

3. The method according to claim 1, wherein the correspondence between the quality of service flow identifier and the QoS parameter comprises:
a correspondence between the quality of service flow identifier and a 5G quality identifier of the quality of service flow; or
a correspondence between the quality of service flow identifier and at least one quality parameter of a priority, a packet delay budget, and a packet error rate ER of the quality of service flow.

4. The method according to claim 1, wherein the quality of service flow identifier and the QoS parameter are carried in a radio resource control message or a non-access stratum message.

5. The method according to claim 1, further comprising:
obtaining, by the first terminal, the quality of service flow identifier, at least one quality parameter of a guaranteed bit rate, and a maximum bit rate of the quality of service flow, wherein there is a correspondence between the quality of service flow identifier and the at least one quality parameter; or
obtaining, by the first terminal, a 5G quality identifier of the quality of service flow, at least one quality parameter of a guaranteed bit rate, and a maximum bit rate of the quality of service flow, wherein there is a correspondence between the 5G quality identifier of the quality of service flow and the at least one quality parameter; and/or
obtaining, by the first terminal, an aggregate maximum bit rate of all non-guaranteed bit rate services sent by the first terminal to the second terminal.

6. The method according to claim 1, wherein before mapping, by the first terminal, the quality of service flow to the logical channel, and sending the quality of service flow to the second terminal, the method further comprises:
determining, by the first terminal, a priority of the logical channel based on a priority of the quality of service flow; or
obtaining, by the first terminal, the priority of the logical channel from the radio access network device.

7. An apparatus, for use as a first terminal, comprising:
at least one processor, and a memory storing instructions for execution by the at least one processor;
wherein, when executed, the instructions cause the apparatus to perform operations comprising:
obtaining a quality of service flow identifier and a QoS parameter of a quality of service flow, wherein there is a correspondence between the quality of service flow identifier and the QoS parameter;
determining a logical channel used by the quality of service flow of the apparatus on a wireless direct communications interface, wherein the wireless direct communications interface is a communications interface between the apparatus and a second terminal; and
mapping the quality of service flow to the logical channel and sending the quality of service flow to the second terminal.

8. The apparatus according to claim 7
wherein determining the logical channel used by the quality of service flow of the apparatus on the wireless direct communications interface comprises:
determining, based on the correspondence, the logical channel used by the quality of service flow of the apparatus on the wireless direct communications interface.

9. The apparatus according to claim 7, wherein the correspondence between the quality of service flow identifier and the QoS parameter of the quality of service flow comprises:
a correspondence between the quality of service flow identifier and a 5G quality identifier of the quality of service flow; or
a correspondence between the quality of service flow identifier and at least one quality parameter of a priority, a packet delay budget, and a packet error rate of the quality of service flow.

10. The apparatus according to claim 7, wherein the quality of service flow identifier and the QoS parameter are carried in a radio resource control message or a non-access stratum message.

11. The apparatus according to claim 7, wherein, when executed, the instructions cause the apparatus to perform operations further comprising:
obtaining the quality of service flow identifier, at least one quality parameter of a guaranteed bit rate, and a maximum bit rate of the quality of service flow, wherein there is a correspondence between the quality of service flow identifier and the at least one quality parameter; or
obtaining, by the apparatus, a 5G quality identifier of the quality of service flow, at least one quality parameter of the guaranteed bit rate, and the maximum bit rate of the quality of service flow, wherein there is a correspondence between the 5G quality identifier of the quality of service flow and the at least one quality parameter; and/or
obtaining an aggregate maximum bit rate of all non-guaranteed bit rate services sent by the apparatus to the second terminal.

12. The apparatus according to claim 7, wherein, when executed, the instructions cause the apparatus to perform operations further comprising:
  before mapping the quality of service flow to the logical channel and sending the quality of service flow to the second terminal:
  determining a priority of the logical channel based on a priority of the quality of service flow; or
  obtaining the priority of the logical channel from the radio access network device.

13. A non-transitory memory storage medium comprising computer-executable instructions that, when executed, facilitate a first terminal to carry out operations comprising:
  obtaining a quality of service flow identifier and a QoS parameter of a quality of service flow, wherein there is a correspondence between the quality of service flow identifier and the QoS parameter;
  determining a logical channel used by the quality of service flow of the first terminal on a wireless direct communications interface, wherein the wireless direct communications interface is a communications interface between the first terminal and a second terminal; and
  mapping the quality of service flow to the logical channel and sending the quality of service flow to the second terminal.

14. The non-transitory memory storage medium according to claim 13,
  wherein determining the logical channel used by the quality of service flow of the first terminal on the wireless direct communications interface comprises:
  determining, based on the correspondence, the logical channel used by the quality of service flow of the first terminal on the wireless direct communications interface.

15. The non-transitory memory storage medium according to claim 13, wherein the correspondence between the quality of service flow identifier and the QoS parameter comprises:
  a correspondence between the quality of service flow identifier and a 5G quality identifier of the quality of service flow; or
  a correspondence between the quality of service flow identifier and at least one quality parameter of a priority, a packet delay budget, and a packet error rate of the quality of service flow.

16. The non-transitory memory storage medium according to claim 13, wherein the quality of service flow identifier and the QoS parameter are carried in a radio resource control message or a non-access stratum message.

17. The non-transitory memory storage medium according to claim 13, wherein the instructions, when executed, carry out further operations comprising:
  obtaining the quality of service flow identifier and at least one quality parameter of a guaranteed bit rate and a maximum bit rate of the quality of service flow, wherein there is a correspondence between the quality of service flow identifier and the at least one quality parameter; or
  obtaining, by the first terminal, a 5G quality identifier of the quality of service flow and at least one quality parameter of the guaranteed bit rate and a maximum bit rate of the quality of service flow, wherein there is a correspondence between the 5G quality identifier of the quality of service flow and the at least one quality parameter; and/or
  obtaining, an aggregate maximum bit rate of all non-guaranteed bit rate services sent by the first terminal to the second terminal.

18. The non-transitory memory storage medium according to claim 13, wherein the instructions, when executed, carry out further operations comprising:
  wherein before mapping the quality of service flow to the logical channel, and sending the quality of service flow to the second terminal:
  determining a priority of the logical channel based on a priority of the quality of service flow; or
  obtaining, a priority of the logical channel from the radio access network device.

* * * * *

UNITED STATES PATENT AND TRADEMARK OFFICE
CERTIFICATE OF CORRECTION

PATENT NO. : 11,678,216 B2
APPLICATION NO. : 17/213656
DATED : June 13, 2023
INVENTOR(S) : Jing Liu et al.

Page 1 of 1

It is certified that error appears in the above-identified patent and that said Letters Patent is hereby corrected as shown below:

In the Claims

In Column 45, Line 43, in Claim 3, after "rate" delete "ER".

Signed and Sealed this
Fifteenth Day of August, 2023

Katherine Kelly Vidal
*Director of the United States Patent and Trademark Office*